United States Patent
Huang et al.

(10) Patent No.: US 11,520,032 B2
(45) Date of Patent: Dec. 6, 2022

(54) METHODS AND APPARATUSES FOR OBJECT PRESENCE DETECTION AND RANGE ESTIMATION

(71) Applicant: Samsung Electronics Co., Ltd., Suwon-si (KR)

(72) Inventors: Pengda Huang, Allen, TX (US); Vutha Va, Plano, TX (US); Wenxun Qiu, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 634 days.

(21) Appl. No.: 16/660,101

(22) Filed: Oct. 22, 2019

(65) Prior Publication Data
US 2020/0278438 A1   Sep. 3, 2020

Related U.S. Application Data

(60) Provisional application No. 62/830,818, filed on Apr. 8, 2019, provisional application No. 62/811,944, filed on Feb. 28, 2019.

(51) Int. Cl.
*G01S 13/56* (2006.01)
*G01S 13/86* (2006.01)
(Continued)

(52) U.S. Cl.
CPC ............ *G01S 13/56* (2013.01); *G01S 13/867* (2013.01); *H04L 25/0212* (2013.01); *H04L 25/03267* (2013.01)

(58) Field of Classification Search
CPC ................................ G01S 13/56; G01S 13/867
See application file for complete search history.

(56) References Cited

U.S. PATENT DOCUMENTS

2010/0226208 A1* 9/2010 Walls ..................... G01S 7/539
367/90
2015/0036773 A1* 2/2015 Lakkis .................. H04B 1/525
375/351
(Continued)

FOREIGN PATENT DOCUMENTS

WO   2017/118621 A1   7/2017

OTHER PUBLICATIONS

International Search Report dated Apr. 13, 2020 in connection with International Patent Application No. PCT/KR2020/000105, 3 pages.
(Continued)

*Primary Examiner* — Erin F Heard
*Assistant Examiner* — Helena H Seraydaryan

(57) ABSTRACT

A method and electronic device for object detection. The electronic device includes at least a first antenna pair comprising a first transmitter antenna configured to transmit signals and a first receiver antenna configured to receive signals, a memory, and a processor. The processor is configured to control the first transmitter antenna to transmit a first signal, generate a channel impulse response (CIR) based on receiving, by the first receiver antenna, a reflection of the first signal, determine a location of at least one leakage peak in the CIR, compare a first segment of taps in the CIR prior to the at least one leakage peak with a second segment of taps in the CIR after the leakage peak, and determine an object is present based on symmetry between the first and second segments of taps.

20 Claims, 17 Drawing Sheets

(51) Int. Cl.
*H04L 25/02* (2006.01)
*H04L 25/03* (2006.01)

(56) References Cited

U.S. PATENT DOCUMENTS

| | | |
|---|---|---|
| 2016/0033622 A1 | 2/2016 | Martone et al. |
| 2017/0212234 A1 | 7/2017 | Heath et al. |
| 2018/0115439 A1 | 4/2018 | Bhatti et al. |
| 2018/0210075 A1* | 7/2018 | Kim ............... G08G 5/0013 |
| 2019/0004145 A1 | 1/2019 | Vossiek et al. |
| 2019/0086531 A1* | 3/2019 | Rick ................ G01S 7/536 |
| 2019/0271775 A1 | 9/2019 | Zhang et al. |

OTHER PUBLICATIONS

Choi, et al., "Achieving Single Channel, Full Duplex Wireless Communication," in Proceedings of Sixteenth Annual International Conference on Mobile Computing and Networking (MobiCom'10), ACM, Chicago, Il, USA, Sep. 2010, 12 pages.

Korpi, et al., "Compact Inband Full-Duplex Relays with Beyond 100 dB Self-Interference Suppression: Enabling Techniques and Field Measurements," IEEE Transactions on Antennas and Propagation, vol. 65, No. 2, Nov. 2016, 6 pages.

* cited by examiner

METHODS AND APPARATUSES FOR OBJECT PRESENCE DETECTION AND RANGE ESTIMATION

CROSS-REFERENCE TO RELATED APPLICATION AND CLAIM OF PRIORITY

This application claims priority under 35 U.S.C. § 119(e) to U.S. Provisional Patent Application No. 62/811,944 filed on Feb. 28, 2019 and U.S. Provisional Patent Application No. 62/830,818 filed on Apr. 8, 2019, the contents of which are incorporated herein by reference in their entireties.

TECHNICAL FIELD

The present disclosure relates generally to detecting objects in radar applications. More specifically, the present disclosure relates to object presence detection and range estimation for radar applications.

BACKGROUND

Radar operates to localize targets in the radar field of view in terms of range and/or angle (azimuth and/or elevation) and/or velocity. For certain types of radars, the transmitter and the receiver can be installed closely together, resulting in signals that are transmitted by the transmitter being received directly by the receiver or bounced off some component or components of the device to reach the receiver. This signal is referred to as a leakage signal. Because the transmitter and the receiver can be installed so closely together, the leakage can be strong.

Due to the presence of sometimes strong leakage signals, detection or range estimation is challenging. In particular, detection or range estimation is challenging for close-range distances of comparable values to the separation between the transmitter and the receiver because the leakage masks the actual target object. Detection at a close range can be compromised due to strong leakage that can mask the target. Even assuming the detection is successful, range estimation can be inaccurate due to the leakage distorting the target response.

SUMMARY

Embodiments of the present disclosure include a method, an electronic device, and a non-transitory computer readable medium for object detection. In one embodiment, the electronic device includes at least a first antenna pair comprising a first transmitter antenna configured to transmit signals and a first receiver antenna configured to receive signals, a memory, and a processor. The processor is configured to control the first transmitter antenna to transmit a first signal, generate a channel impulse response (CIR) based on receiving, by the first receiver antenna, a reflection of the first signal, determine a location of at least one leakage peak in the CIR, compare a first segment of taps in the CIR prior to the at least one leakage peak with a second segment of taps in the CIR after the leakage peak, and determine an object is present based on symmetry between the first and second segments of taps.

In another embodiment, a method of object detection includes transmitting, via at least one transmitter antenna of an electronic device, a first signal, generating a CIR based on receiving, by at least one receiver antenna of the electronic device, a reflection of the first signal, determining a location of at least one leakage peak in the CIR, comparing a first segment of taps in the CIR prior to the at least one leakage peak with a second segment of taps in the CIR after the leakage peak, and determining an object is present based on symmetry between the first and second segments of taps.

In another embodiment, a non-transitory computer readable medium is provided. The non-transitory computer readable medium stores instructions that, when executed by a processor of an electronic device, cause the processor to control to transmit, via at least one transmitter antenna of the electronic device, a first signal, generate a CIR based on receiving, by at least one receiver antenna of the electronic device, a reflection of the first signal, determine a location of at least one leakage peak in the CIR, compare a first segment of taps in the CIR prior to the at least one leakage peak with a second segment of taps in the CIR after the leakage peak, and determine an object is present based on symmetry between the first and second segments of taps.

Other technical features may be readily apparent to one skilled in the art from the following figures, descriptions, and claims.

Before undertaking the DETAILED DESCRIPTION below, it may be advantageous to set forth definitions of certain words and phrases used throughout the present disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout the present disclosure. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which like reference numerals represent like parts.

DETAILED DESCRIPTION

FIGS. 1 through 20, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged wireless device or wireless communication system.

Figure 1:
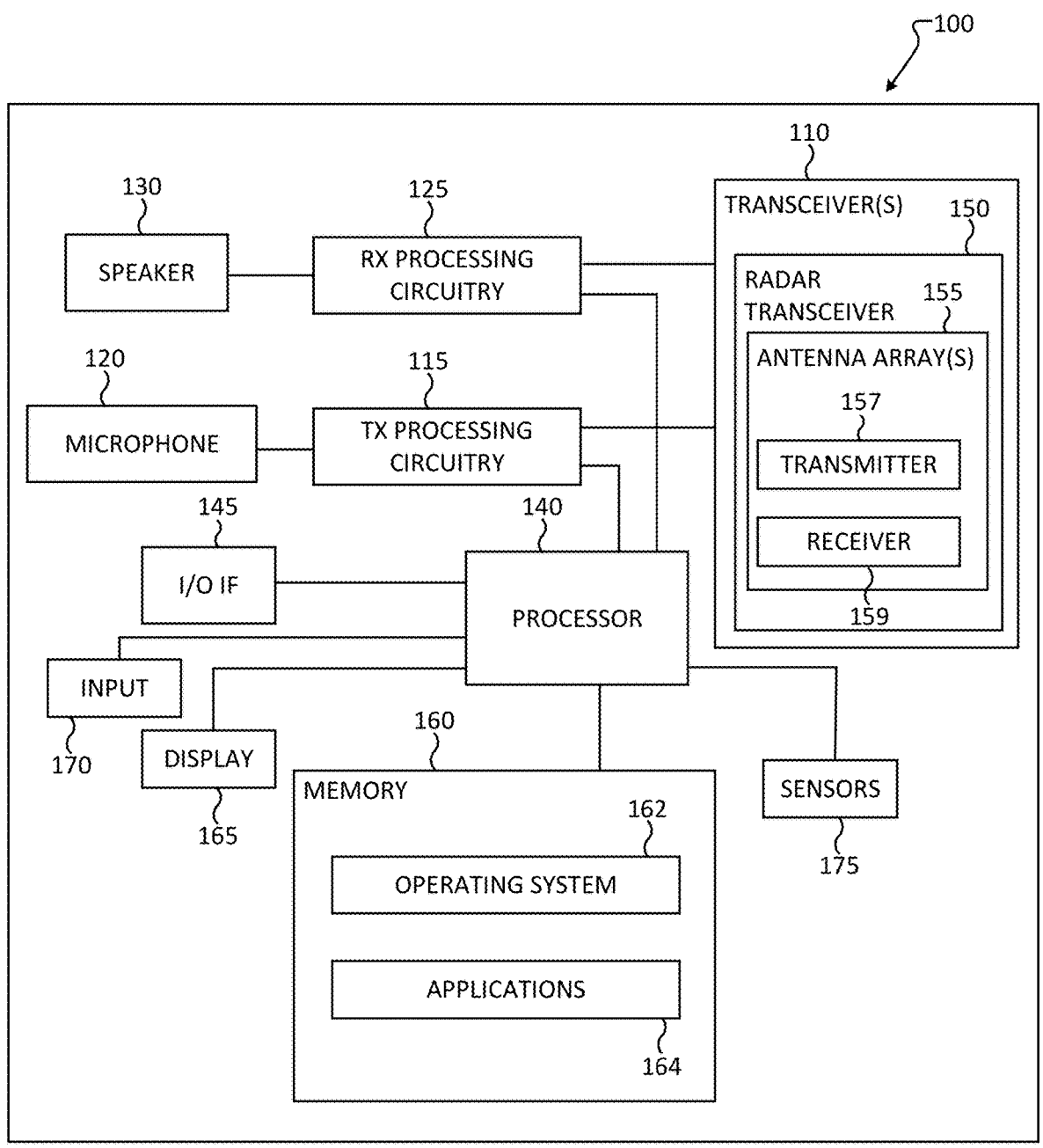
FIG. 1 illustrates an electronic device according to various embodiments of the present disclosure.

FIG. 1 illustrates an electronic device according to various embodiments of the present disclosure. The embodiment of the electronic device 100 shown in FIG. 1 is for illustration only. Other embodiments can be used without departing from the scope of the present disclosure.

As shown in FIG. 1, the electronic device 100 includes a radio frequency (RF) transceiver 110, transmit (TX) processing circuitry 115, a microphone 120, receive (RX) processing circuitry 125, a speaker 130, a processor 140, an input/output (I/O) interface (IF) 145, a memory 160, a display 165, an input 170, and sensors 175. The memory 160 includes an operating system (OS) 162 and one or more applications 164.

The transceiver 110 transmits signals to other components in a system and receives incoming signals transmitted by other components in the system. For example, the transceiver 110 transmits and receives RF signals, such as BLUETOOTH or WI-FI signals, to and from an access point (such as a base station, WI-FI router, BLUETOOTH device) of a network (such as a WI-FI, BLUETOOTH, cellular, 5G, LTE, LTE-A, WiMAX, or any other type of wireless network). The received signal is processed by the RX processing circuitry 125. The RX processing circuitry 125 can transmit the processed signal to the speaker 130 (such as for voice data) or to the processor 140 for further processing (such as for web browsing data). The TX processing circuitry 115 receives voice data from the microphone 120 or other outgoing data from the processor 140. The outgoing data can include web data, e-mail, or interactive video game data. The TX processing circuitry 115 processes the outgoing data to generate a processed signal. The transceiver 110 receives the outgoing processed signal from the TX processing circuitry 115 and converts the received signal to an RF signal that is transmitted via an antenna. In other embodiments, the transceiver 110 can transmit and receive radar signals to detect the potential presence of an object in the surrounding environment of the electronic device 100.

In this embodiment, one of the one or more transceivers 110 includes is a radar transceiver 150 configured to transmit and receive signals for detection and ranging purposes. For example, the radar transceiver 150 can be any type of transceiver including, but not limited to a WiFi transceiver, for example, an 802.11ay transceiver. The radar transceiver 150 includes one or more antenna arrays 155, or antenna pairs 155, that each includes a transmitter 157, or transmitter antenna 157, and a receiver 159, or receiver antenna 159. The transmitter 157 can transmit signals at frequencies including, but not limited to, 6-8 GHz, 28 GHz, 39 GHz, 60 GHz, and 77 GHz. In some embodiments, the signals transmitted by the radar transceiver 150 can include, but are not limited to, millimeter wave (mmWave) signals. The radar transceiver 150 can receive the signals, which were originally transmitted from the radar transceiver 150, after the signals have bounced or reflected off of target objects in the surrounding environment of the electronic device 100.

The processor 140 can analyze the time difference between when the signals are transmitted by the radar transceiver 150 and received by the radar transceiver 150 to measure the distance of the target objects from the electronic device 100.

As described herein, in some embodiments each of the plurality of antenna pairs 155 can include at least one of the plurality of transmitters 157 and at least one of the plurality of receivers 159. The antenna array 155, or antenna pair 155, can include a plurality of antenna arrays 155 including at least one of the plurality of transmitters 157 and at least one of the plurality of receivers 159.

The transmitter 157 and the receiver 159 can be fixed near in proximity to each other such that the distance of separation between them is small. For example, the transmitter 157 and the receiver 159 can be located within a few centimeters of each other. In some embodiments, the transmitter 157 and the receiver 159 can be co-located in a manner that the distance of separation is indistinguishable. Based on the fixed, constant spatiotemporal relationship of the transmitter 157 and the receiver 159, the processor 140 can use information regarding the spatiotemporal relationship of the transmitter 157 and the receiver 159 to cancel leakage, such as radar leakage, in a response signal resulting from a transmitted radar signal leaking to the receiver 159. For example, the response signal can be a CIR as further described herein in FIG. 3.

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The transceiver 110 receives the outgoing processed baseband or IF signal from the TX processing circuitry 115 and up-converts the baseband or IF signal to an RF signal that is transmitted via the antenna 105.

The processor 140 is also capable of executing the operating system 162, or OS program 162, in the memory 160 in order to control the overall operation of the electronic device 100. For example, the processor 140 can move data into or out of the memory 160 as required by an executing process. In some embodiments, the processor 140 is configured to execute the applications 164 based on the OS program 162 or in response to signals received from external devices or an operator. In some embodiments, the memory 160 is further configured to store data, such as one or more leakage factors, that the processor 140 can utilize to perform leakage cancelation as described herein. In some embodiments, the processor 140 can control the reception of forward channel signals and the transmission of reverse channel signals by the transceiver 110, the RX processing circuitry 125, and the TX processing circuitry 115 in accordance with well-known principles. In some embodiments, the processor 140 includes at least one microprocessor or microcontroller.

The processor 140 is also coupled to the I/O interface 145, the display 165, the input 170, and the sensor 175. The I/O interface 145 provides the electronic device 100 with the ability to connect to other devices such as laptop computers and handheld computers. The I/O interface 145 is the communication path between these accessories and the processor 140. The display 165 can be a liquid crystal display (LCD), light-emitting diode (LED) display, organic LED (OLED), active matrix OLED (AMOLED), or other display capable of rendering text and/or graphics, such as from websites, videos, games, images, and the like.

The processor 140 can be coupled to the input 170. An operator of the electronic device 100 can use the input 170 to enter data or inputs into the electronic device 100. Input 170 can be a keyboard, touch screen, mouse, track-ball, voice input, or any other device capable of acting as a user interface to allow a user to interact with electronic device 100. For example, the input 170 can include voice recognition processing thereby allowing a user to input a voice command via microphone 120. For another example, the input 170 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme.

The electronic device 100 can further include one or more sensors 175 that meter a physical quantity or detect an activation state of the electronic device 100 and convert metered or detected information into an electrical signal. For example, the sensor(s) 175 can include one or more buttons for touch input, one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, a fingerprint sensor, and the like. The sensor(s) 175 can further include a control circuit for controlling at least one of the sensors included therein.

In various embodiments, the electronic device 100 can be a phone or tablet. In other embodiments, the electronic device 100 can be a robot or any other electronic device using a radar transceiver. FIG. 1. does not limit the present disclosure to any particular type of electronic device.

Figure 2:
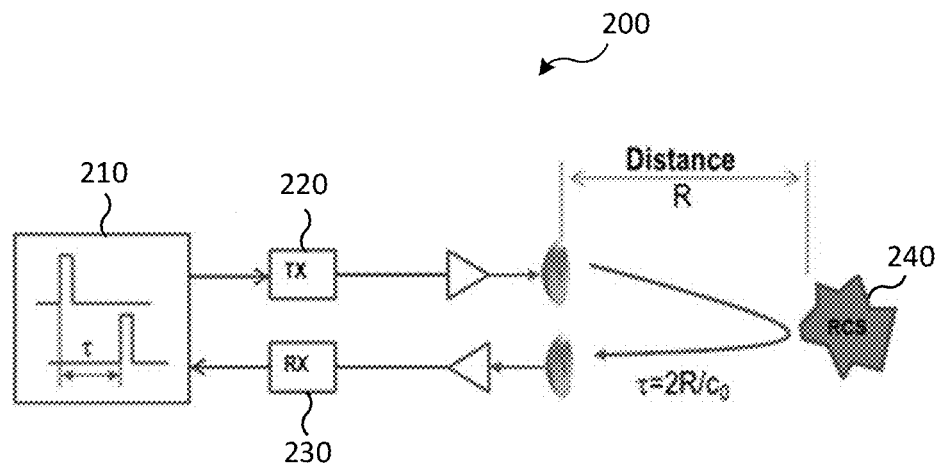
FIG. 2 illustrates a monostatic radar according to various embodiments of the present disclosure.

FIG. 2 illustrates a monostatic radar according to various embodiments of the present disclosure. The embodiment of the monostatic radar 200 shown in FIG. 2 is for illustration only. Other embodiments can be used without departing from the scope of the present disclosure. The monostatic radar 200 illustrated in FIG. 2 includes a processor 210, a transmitter 220, and a receiver 230. In some embodiments, the processor 210 can be the processor 140.

In some embodiments, the transmitter 220 and the receiver 230 can be the transmitter 157 and receiver 159, respectively, included in the antenna arrays 155. In various embodiments, the transmitter 220 and the receiver 230 are co-located using a common antenna or nearly co-located while separate but adjacent antennas. The monostatic radar 200 is assumed to be coherent such that the transmitter 220 and the receiver 230 are synchronized via a common time reference.

The processor 210 controls the transmitter 220 to transmit a radar signal or radar pulse. The radar pulse is generated as a realization of a desired "radar waveform" modulated onto a radio carrier frequency and transmitted through a power amplifier and antenna (shown as a parabolic antenna), such as the transmitter 220, either omni-directionally or focused into a particular direction. After the radar pulse has been transmitted, a target 240 at a distance R from the radar 200 and within a field-of-view of the transmitted pulse will be illuminated by RF power density $p_t$ (in units of W/m$^2$) for the duration of the transmission. To the first order, $p_t$ is described by Equation 1:

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2},$$

where $P_T$ is a transmit power [W], $G_T$, is a transmit antenna gain [dBi], $A_T$ is an effective aperture area [m²], λ is a wavelength of the radar signal RF carrier signal [m], and R is the target distance [m].

The transmit power density impinging onto the target surface leads to reflections depending on the material composition, surface shape, and dielectric behavior at the frequency of the radar signal. Off-direction scattered signals are generally not strong enough to be received back at the receiver 230, so only direct reflections contribute to a detectable, received signal. Accordingly, the illuminated area or areas of the target with normal vectors directing back to the receiver 230 act as transmit antenna apertures with directivities, or gains, in accordance with their effective aperture area or areas. The reflected-back power $P_{refl}$ is described by Equation 2:

$$P_{refl} = p_t A_t G_t \sim p_t A_t r_t \frac{A_t}{(\lambda^2/4\pi)} = p_t RCS,$$

where $P_{refl}$ is an effective (isotropic) target-reflected power [W], $A_t$ is an effective target area normal to the radar direction [m2], $r_t$ is a reflectivity of the material and shape [0, . . . , 1], $G_t$ is a corresponding aperture gain [dBi], and RCS is a radar cross section [m²].

As depicted in Equation 2, the radar cross section (RCS) is an equivalent area that scales proportionally to the square of the actual reflecting area, is inversely proportional to the square of the wavelength, and is reduced by various shape factors and the reflectivity of the material itself. For example, for a flat, fully reflecting mirror of an area $A_r$, large compared with $\lambda^2$, RCS=$4\pi A_r^2/\lambda^2$. Due to the material and shape dependency, it is difficult to deduce the actual physical area of the target 240 based on the reflected power even if the distance R from the target to the radar 200 is known.

The target-reflected power at the location of the receiver 230 is based on the reflected-power density at the reverse distance R, collected over the receiver antenna aperture area. The received, target-reflected power $P_R$ is described by Equation 3:

$$P_R = \frac{P_{refl}}{4\pi R^2} A_R = P_T \cdot RCS \frac{A_T A_R}{4\pi \lambda^2 R^4},$$

where $P_R$ is the received, target-reflected power [W] and $A_R$ is the receiver antenna effective aperture area [m²]. In some embodiments, $A_R$ can be the same as $A_T$.

Such a radar system is usable as long as the receiver signal exhibits a sufficient signal-to-noise ratio (SNR). The particular value of the SNR depends on the waveform and detection method used. The SNR is described by Equation 4:

$$SNR = \frac{P_R}{kT \cdot B \cdot F},$$

where kT is Boltzmann's constant x temperature [W/Hz], B is the radar signal bandwidth [Hz], and F is the receiver noise factor, referring to the degradation of receive signal SNR due to noise contributions to the receiver circuit itself.

In some embodiments, the radar signal can be a short pulse with a duration, or width, denoted by $T_P$. In these embodiments, the delay τ between the transmission and reception of the corresponding echo will be equal to π=2R/c, where c is the speed of light propagation in the medium, such as air. In some embodiments, there can be several targets 240 at slightly different distances R. In these embodiments, the individual echoes of each separate target 240 is distinguished as such only if the delays differ by at least one pulse width, and the range resolution of the radar is described as $\Delta R=c\Delta\tau/2=cT_P/2$. A rectangular pulse of duration $T_P$ exhibits a power spectral density $P(f) \sim (\sin(\pi f T_P)/(\pi f T_P))^2$ with the first null at its bandwidth $B=1/T_P$. Therefore, the connection of the range resolution of a radar with the bandwidth of the radar waveform is described by Equation 5:

$$\Delta R = c/2B$$

Based on the reflected signals received by the receiver 230, the processor 210 generates a metric that measures the response of the reflected signal as a function of the distance of the target 240 from the radar. In some embodiments, the metric can be a CIR.

Figure 3:
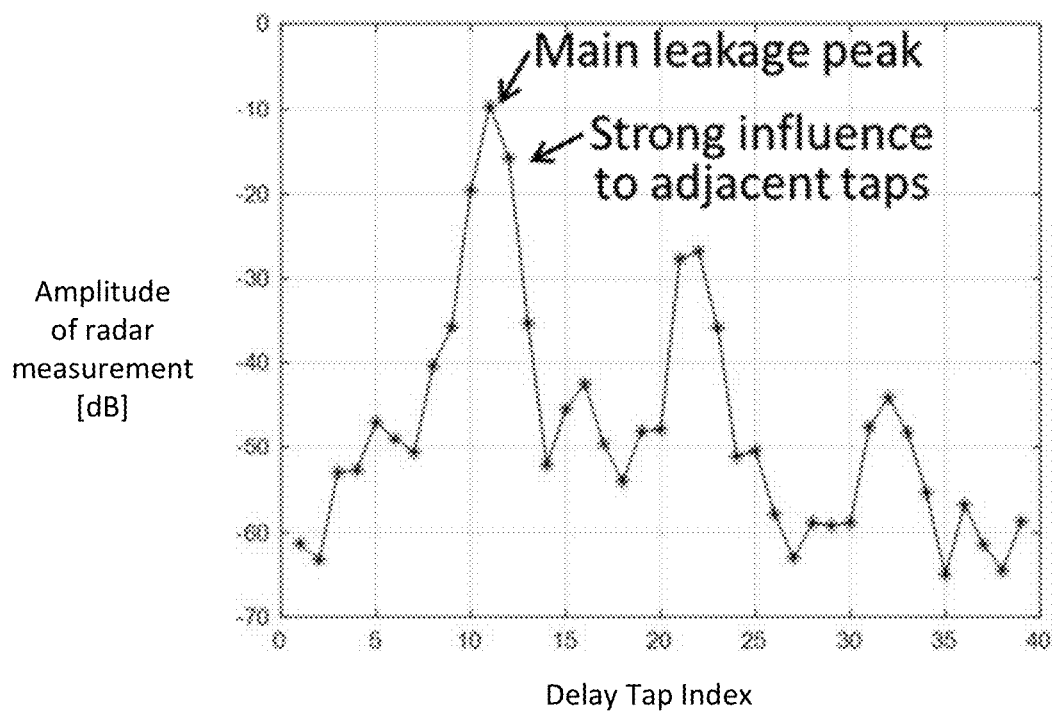
FIG. 3 illustrates an example of a CIR according to various embodiments of the present disclosure.

FIG. 3 illustrates an example of a CIR depicting a measured leakage response according to various embodiments of the present disclosure. The CIR is a response metric based on the signals received by the receiver 230. For example, the CIR is a measure of amplitude and/or phase of a reflected signal as a function of distance. As shown in FIG. 3, the CIR is depicted with the delay tap index denoted on the x-axis, measuring the distance, and the amplitude of the radar measurement [dB] denoted on the y-axis. In a monostatic radar, for example the radar 200, that has separate transmitting and receiving antenna modules, a strong signal can radiate directly from the transmitter 220 to the receiver 230 causing a strong response at the delay corresponding to the separation between the transmitter 220 and receiver 230. The strong signal radiating from the transmitter 220 to the receiver 230 is referred to as a leakage signal. Even if the direct leakage signal from the transmitter 220 can be assumed to correspond to a single delay, the effect of the direct leakage signal can still impact multiple delay taps adjacent to the direct leakage signal.

In the measured leakage response illustrated in FIG. 3, the main leakage peak is denoted at tap 11. In addition, taps 10 and 12 also have strong responses, noted by the responses being greater than 20 dB above the noise floor. Because of the additional responses such as shown at taps 10 and 12, it is difficult to reliably detect and estimate the target range within those first few taps from the leakage taps.

Figure 4:
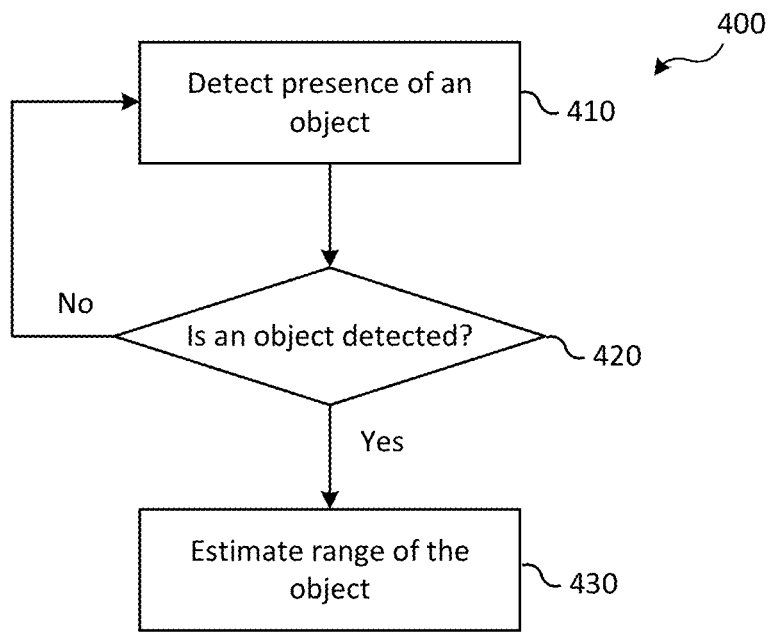
FIG. 4 illustrates a method of object presence detection and range estimation according to various embodiments of the present disclosure.

FIG. 4 illustrates a method of object presence detection and range estimation according to various embodiments of the present disclosure. The method 400 is for illustration only, and includes one or more embodiments described herein. More or fewer steps or operations can be included in method 400.

In operation 410, the processor 140 detects the potential presence of an object within a range from the electronic device 100 or within the field of view of the electronic device 100. The range from the electronic device 100 can be a preset range or can vary based on the particular type of transmitter 157 and receiver 159. The field of view of the electronic device 100 can further include a preset field or can be based on the particular type of transmitter 157 and receiver 159.

In operation 420, the processor 140 determines whether the object is detected. In some embodiments, the determination can be based on whether an object is within a range from the electronic device 100, whether the object is within the field of view of the electronic device 100, or both. If the object is detected, the processor 140 proceeds to operation 430. If the object is not detected, the processor 140 returns to operation 410 and continues the detection.

In operation 430, the processor 140 estimates the range of the detected object from the electronic device 100 using one or more of the methods described herein. For example, the processor 140 can determine a specific distance of the detected object from the electronic device 100 or determine a range of potential distances of the detected object from the electronic device 100. Although described herein as including each of operations 410-430, various embodiments of the present disclosure can include more or fewer operations.

Figure 5:
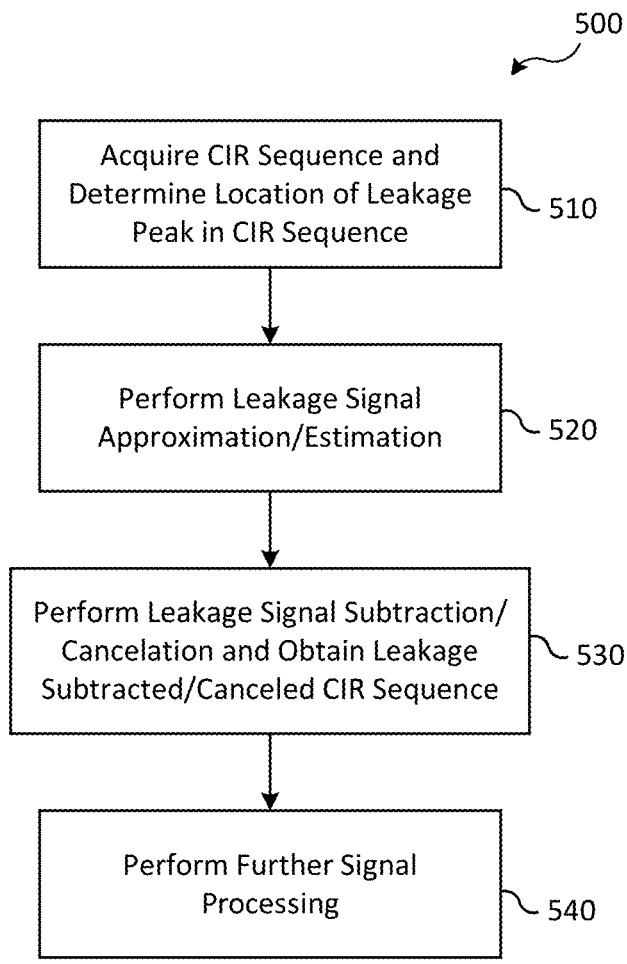
FIG. 5 illustrates a method of leakage mitigation according to various embodiments of the present disclosure.

FIG. 5 illustrates a method of leakage mitigation according to various embodiments of the present disclosure. In particular, FIG. 5 illustrates a method 500 of mitigating or canceling leakage based on leakage approximation and estimation. The method 500 is for illustration only, and includes one or more embodiments described herein. More or fewer steps or operations can be included in method 500.

In operation 510, the processor 140 acquires a CIR sequence. In some embodiments, the CIR sequence can be a CIR that is the CIR sequence of FIG. 3 or is similar to the CIR sequence of FIG. 3. The processor 140 can obtain the CIR sequence by analyzing and measuring the signal transmitted by the transmitter 157 and received by the receiver 159. Once the CIR sequence is obtained, the processor 140 determines a location of a leakage peak in the CIR sequence. The processor 140 can determine the location of the leakage peak in the CIR sequence based on various methods described herein. For example, the processor 140 can determine the location of the leakage peak based on the tap that has the greatest amplitude in the CIR sequence. As another example, the processor 140 can determine the leakage peak by searching for the leakage peak in a look-up table that is stored in the memory 160. Because the leakage does not change, the look-up table including leakage peaks for one or more CIR sequences can be saved, or stored, in the memory 160.

In operation 520, the processor 140 performs leakage signal approximation and estimation. Based on the leakage signal taps presented before and including the leakage peak tap, the processor 140 approximates, or estimates, the taps that include the leakage signal.

In operation 530, the processor 140 performs leakage signal cancelation to obtain the leakage canceled CIR sequences. To perform the leakage signal cancelation on the CIR sequence, the processor 140 removes, or subtracts, the estimated leakage signal from the CIR sequence corresponding to the taps after, and potentially including, the peak leakage taps. The result of subtracting the estimated leakage signal from the CIR sequence is the leakage canceled CIR sequence. The leakage canceled CIR sequence corresponds to the taps after, and potentially including, the peak leakage taps.

In some embodiments, the leakage cancelation, such as subtraction, can be partial cancelation rather than full cancelation. For example, the processor 140 can perform partial leakage cancelation in order to mitigate direct RF leakage from the transmitter 157 to the receiver 159, but residual leakage energy after the leakage cancelation can be present if the residual leakage is not direct RF leakage. As another example, the partial leakage cancelation can have no effect or little effect on intermediate frequency (IF) cable reflection leakage.

In operation 540, the processor 140 performs further signal processing based on the obtained leakage canceled CIR sequence. In various embodiments, the further signal processing can include detecting the presence of an object, such as a target object, and range and/or angle estimation of the detected object. The method 500 enables leakage signal approximation/estimation, and mitigation/cancellation and further signal processing, e.g. object presence detection, range and/or angle detection, etc. to be performed based on the same CIR sequence.

Figure 6:
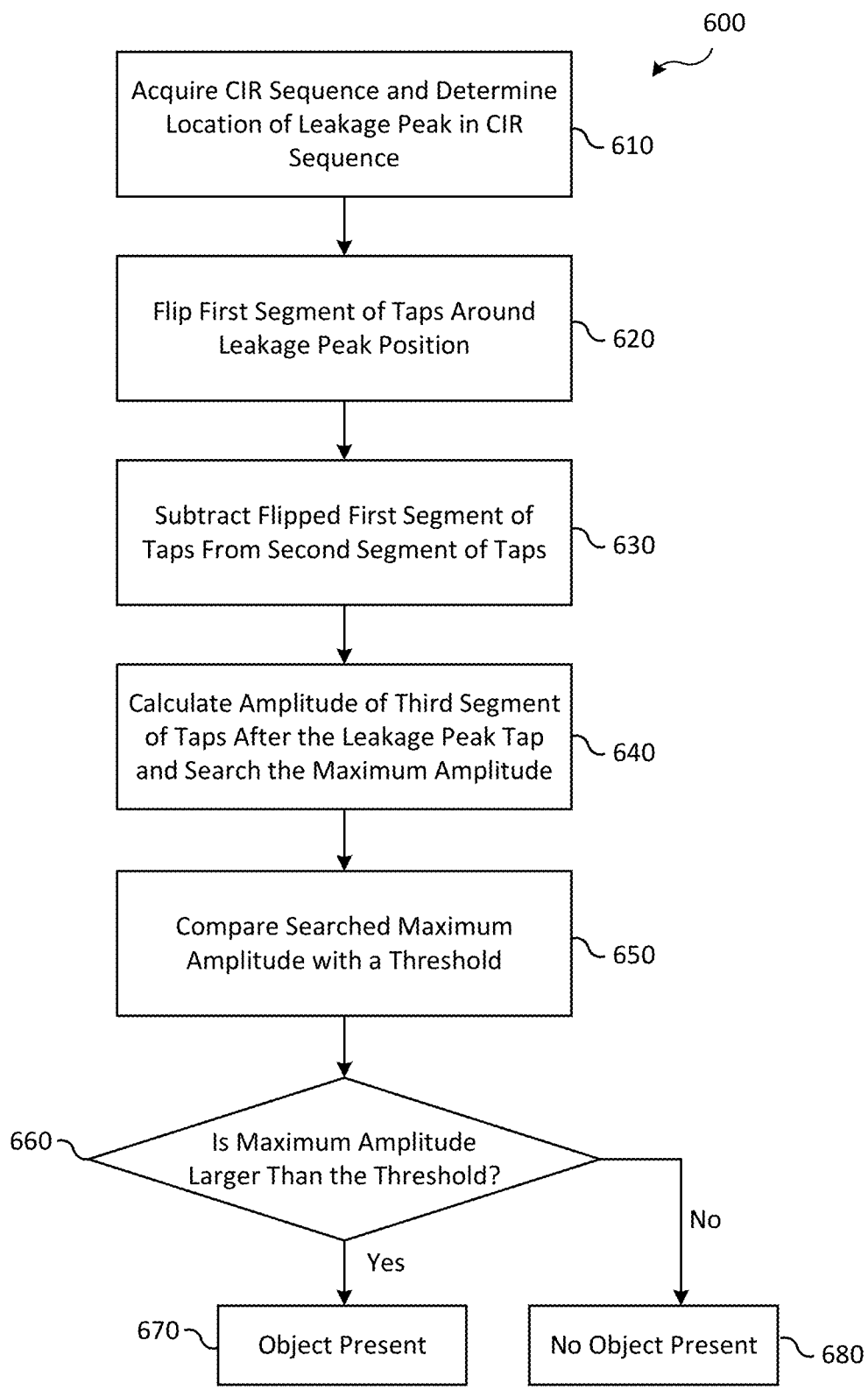
FIG. 6 illustrates a method of object presence detection according to various embodiments of the present disclosure.

FIG. 6 illustrates a method of object presence detection according to various embodiments of the present disclosure. The method 600 is for illustration only, and includes one or more embodiments described herein. More or fewer steps or operations can be included in method 600.

In operation 610, the processor 140 acquires the CIR sequence and determines a location of the leakage peak in the CIR sequence. In some embodiments, the CIR sequence can be a CIR that is the CIR sequence of FIG. 3 or is similar to the CIR sequence of FIG. 3. The processor 140 can obtain the CIR sequence by analyzing and measuring the signal transmitted by the transmitter 157 and received by the receiver 159. Once the CIR sequence is obtained, the processor 140 determines a location of a leakage peak in the CIR sequence. The processor 140 can determine the location of the leakage peak in the CIR sequence based on the tap that has the greatest amplitude in the CIR sequence. As another example, the processor 140 can determine the leakage peak by searching for the leakage peak in a look-up table that is stored in the memory 160. Because the leakage does not change, the look-up table including leakage peaks for one or more CIR sequences can be saved, or stored, in the memory 160.

In various embodiments throughout the present disclosure, the leakage peak location and its signature are stable. In other words, the leakage tap index is fixed and can be obtained, or measured, during manufacture of the electronic device 100. The particular leakage tap index depends on the cable length of the particular antenna array 155. For example, the leakage peak location is typically repeated on a consistent basis because the location of the antenna arrays 155, including the transmitter 157 and receiver 159, on the electronic device 100 are fixed resulting in a consistent relationship between each specific transmitter 157 and receiver 159. This can be described as a constant spatiotemporal relationship. The constant spatiotemporal relationship leads to a stable signature of the leakage peak location for each set of antenna arrays 155. In other words, the amplitude and phase of the leakage peak are stable.

In operation 620, the processor 140 can flip a first segment of CIR taps immediately before, i.e. on the left side of, the leakage peak around the tap indicating the leakage peak. The first segment of CIR taps can be snapped, or identified and isolated, and then flipped around the leakage peak. Flipping the first segment of CIR taps can be described by Equation 6:

$$C'_{t+n}=C_{t-n}; n=0,1,\ldots,N_1$$

where $C'_{t+n}$ is the result of the flipping operation, $C_t$ is the leakage peak tap, and $N_1$ is the width of the segment. In some embodiments, the length of the first segment can be determined by the width of the leakage peak pulse which are the CIR taps adjacent to the leakage peak tap with stronger energy/amplitude compared to the noise energy, with energy/amplitude above a certain threshold from the noise energy level, or with energy/amplitude within a certain threshold from the leakage peak energy level.

For example, as depicted in FIG. 3, the main leakage peak is identified at delay tap 11. When the width of the segment, $N_1$, is identified as two, the processor 140 can flip the two delay taps immediately prior to delay tap 11 around the leakage peak. In the example of the CIR in FIG. 3, a segment of two corresponds to delay taps 9 and 10. Flipping delay taps 9 and 10 around the leakage peak identified at delay tap 11 flips delay taps 9 and 10 in a manner that the delay taps 9 and 10 are overlaid on delay taps 13 and 12, respectively. As another example, when the width of the segment, $N_1$, is identified as three, the processor 140 can flip the three delay taps immediately prior to delay tap 11, identified as delay taps 8, 9, and 10, around the leakage peak such that delay taps 8, 9, and 10 are overlaid on delay taps 14, 13, and 12, respectively.

In operation 630, the processor 140 subtracts the flipped first CIR segment from a second segment of taps immediately after, i.e. on the right side of, the leakage peak tap. For example, in the example where the width of the segment, $N_1$, is identified as two, the processor 140 subtracts the amplitude of delay tap 9 from the amplitude of delay tap 13 and subtracts the amplitude of delay tap 10 from the amplitude of delay tap 12. In the example where the width of the segment, $N_1$, is identified as three, the processor subtracts the amplitude of delay tap 8 from the amplitude of delay tap 14, subtracts the amplitude of delay tap 9 from the amplitude of delay tap 13, and subtracts the amplitude of delay tap 10 from the amplitude of delay tap 12. In some embodiments, the subtraction can be performed based on minimum mean square error (MMSE) operations.

The length of the second segment can be assumed to be the same as that of the first segment, i.e. $C_{t+n}$; n=0, 1, . . . , $N_1$. In some embodiments, the length of the second segment ($N_2$) can be determined based on the number of adjacent taps after the leakage peak tap with energy/amplitude above a certain threshold from the noise energy level, or with energy/amplitude within a certain threshold from the leakage peak energy level. When $N_1$ is not equal to $N_2$, the minimum of $N_1$ and $N_2$ can be used for the subtraction operation.

Based on the subtraction in operation 630, the processor 140 can determine whether a level of symmetry between the first segment of taps and the second segment of taps is inside of or outside of a predefined symmetry threshold. A leakage peak has approximately symmetrical taps on either side of the peak. Accordingly, the processor 140 can make a preliminary determination that an object is present based on the symmetry between the first segment of taps and the second segments of taps being outside of the predefined symmetry threshold. The processor 140 can make a preliminary determination that an object is unlikely to be present based on the symmetry between the first segment of taps and the second segments of taps being inside of the predefined symmetry threshold.

In operation 640, the processor 140 can calculate an amplitude of a third segment of taps after the leakage peak tap and search for the maximum amplitude. The third segment of taps can be a segment of taps after, i.e. to the right of, the leakage peak. The length of the third segment can be determined based on the distance within which a presence detection is to be performed. Following the length of the third segment being determined, the amplitude of the third segment can be calculated. An example of the first segment, second segment, and third segment is illustrated in FIG. 7, discussed below.

In operation 650, the processor 140 compares the searched maximum amplitude with a maximum amplitude threshold. The maximum amplitude threshold can be preset by the processor 140 or can be dynamically determined. In operation 660, based on the comparison in operation 650, the processor 140 determines whether the searched for maximum amplitude is larger than the maximum amplitude threshold. If the searched for maximum amplitude is larger than the maximum amplitude threshold, the processor 140 proceeds to operation 670 and determines an object is present. If the searched for maximum amplitude is not larger than the maximum amplitude threshold, the processor 140 proceeds to operation 680 and determines no object is present. In some embodiments, based on the processor 140 determining an object is present in operation 670, the processor 140 can then perform further signal processing, such as described in operation 540.

Figure 7:
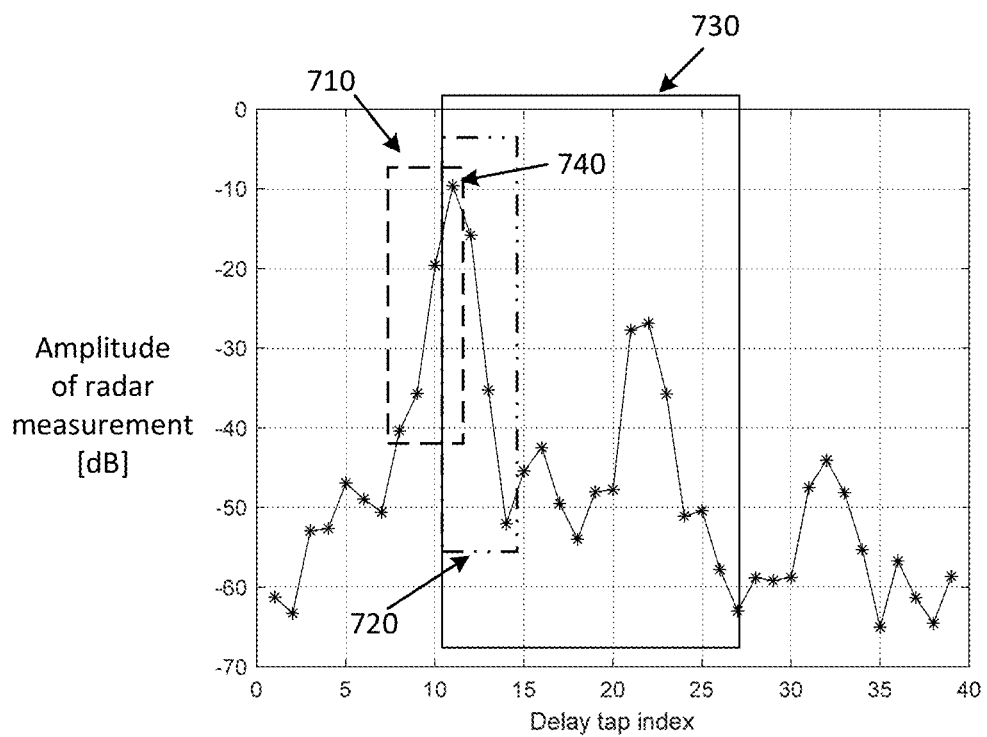
FIG. 7 illustrates an example CIR sequence according to various embodiments of the present disclosure.

FIG. 7 illustrates an example CIR sequence according to various embodiments of the present disclosure. In particular, FIG. 7 illustrates an example CIR sequence indicating a first segment, second segment, and third segment. The CIR sequence illustrating the first segment 710, the second segment 720, the third segment 730, and the main leakage peak 740 is for illustration only and includes one or more embodiments described herein. For example, the main leakage peak 740 can be located at any particular location in the CIR sequence. Further, the first segment 710, the second segment 720, the third segment 730 can include more or fewer delay taps than are depicted in FIG. 7.

As illustrated in FIG. 7, the CIR sequence includes a main leakage peak 740 at tap 11. The CIR sequence further includes a first segment 710, a second segment 720, and a third segment 730. The first segment 710 includes the main leakage peak 740 and three delay taps before, i.e. to the left of, the main leakage peak 740. In particular, the first segment 710 includes three delays taps at 8, 9, and 10 in addition to the main leakage peak 740 at tap 11. The second segment 720 includes the main leakage peak 740 and three delay taps after, i.e. to the right of, the main leakage peak 740 at 12, 13, and 14 in addition to the main leakage peak 740 at tap 11. The third segment 730 includes sixteen delay taps after, i.e. to the right of, the main leakage peak 740 at 12-27 in addition to the main leakage peak 740 at tap 11.

Figure 8A:
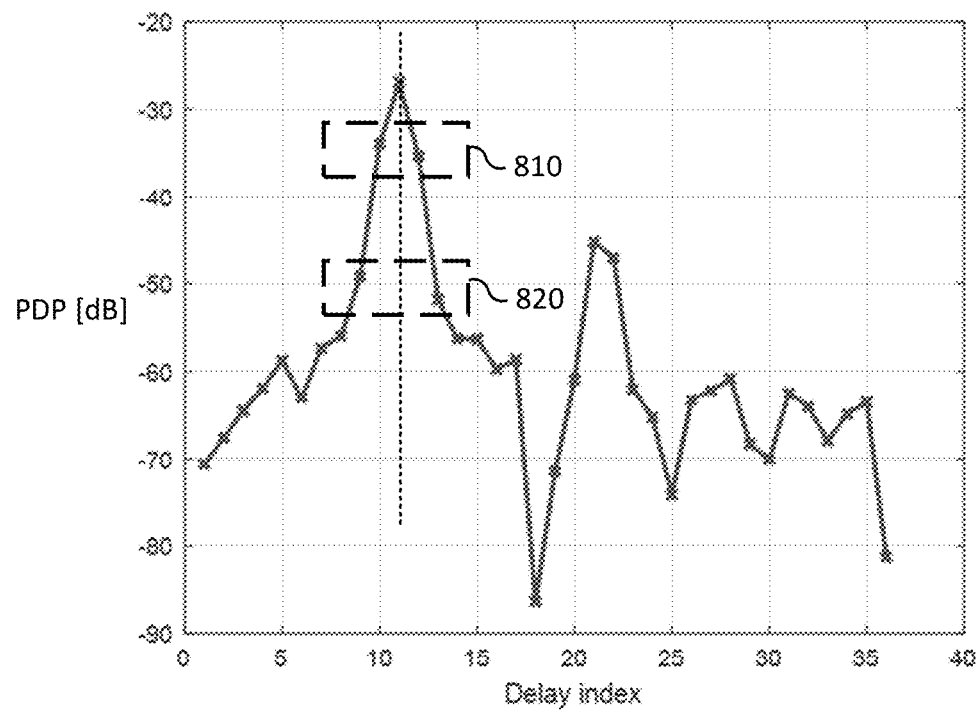
FIG. 8A illustrates a CIR sequence with symmetrical, or approximately symmetrical, delay taps in a first segment and a second segment according to various embodiments of the present disclosure.

FIG. 8A illustrates a CIR sequence with symmetrical, or approximately symmetrical, delay taps in a first segment and a second segment according to various embodiments of the present disclosure. The CIR sequence in FIG. 8A is for illustration only and includes one or more embodiments described herein. FIG. 8A utilizes a segment length of two as discussed in the description of FIG. 6.

FIG. 8A illustrates a main leakage peak at delay tap 11. A dashed line is shown at delay tap 11 indicating the difference between a first segment of taps before the main leakage peak and a second segment of taps after the main leakage peak. The CIR sequence includes a first set of delay taps 810 and a second set of delay taps 820. The first set of delay taps 810 includes a delay tap at 10 and a delay tap at 12. The delay tap at 10 is included in the first segment of delay taps and the delay tap at 12 is included in the second segment of delay taps. As illustrated in FIG. 8A, the delay tap at 10 and the delay tap at 12 have a similar amplitude, indicated by similarity in the power delay profile (PDP) [dB]. In some embodiments, the PDP can be the same as the amplitude of radar measurement described in FIG. 7. The delay tap at 10 and the delay tap at 12 are considered to be symmetrical, or approximately symmetrical, based on the similar amplitude. Likewise, the second set of delay taps 820 includes a delay tap at 9 and the delay tap at 13. The delay tap at 9 is included in the first segment of delay taps and the delay tap at 13 is included in the second segment of delay taps. As illustrated in FIG. 8A, the delay tap at 9 and the delay tap at 13 have a similar amplitude, indicated by the PDP [dB]. The delay tap at 9 and the delay tap at 13 are considered to be symmetrical, or approximately symmetrical, based on the similar amplitude.

The processor 140 can use a preset or dynamically changed range to determine the specificity of approximately symmetrical. For example, the processor 140 can determine whether an amplitude of delay taps is less than 10 dB, less than 5 dB, less than 3 dB, less than 1 dB, or any other measure to determine whether the first segment and the second segment are symmetrical. In other embodiments, the processor 140 can determine whether an amplitude of delay taps is exactly the same to determine whether the first segment and the second segment are symmetrical.

In various embodiments, each of the delay taps in the first segment and the second segment illustrated in FIG. 8A are considered to be symmetrical, or approximately symmetrical. Accordingly, the processor 140 can determine that the first segment and the second segment are symmetrical, or approximately symmetrical. For example, if the CIR sequence of FIG. 8A is analyzed in operation 620 of FIG. 6, the processor 140 can flip the delay taps of the first segment and determine that the delay taps are approximately symmetrical to the delay taps of the second segment.

As described in operations 620 and 630, the processor 140 can determine whether the first segment of taps and the second segment of taps are symmetrical by flipping the first segment of delay taps around the main leakage peak and comparing the flipped first segment of delay taps to the second segment of delay taps. As described in FIG. 8A, the processor 140 can determine that the first segment and the second segment are symmetrical, or approximately symmetrical.

Figure 8B:
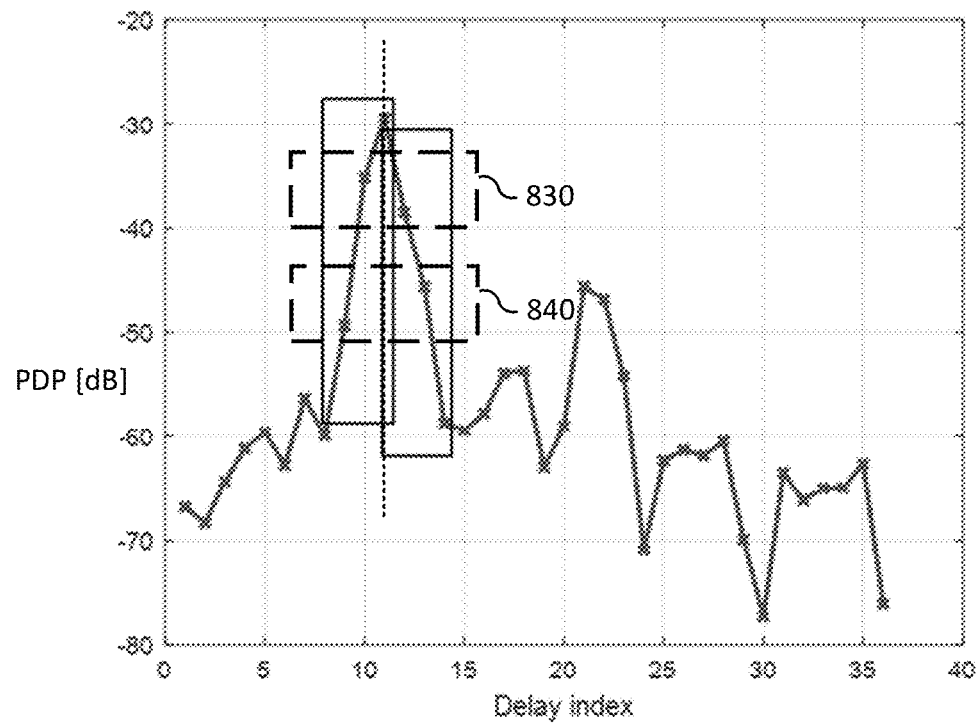
FIG. 8B illustrates a CIR sequence with asymmetrical delay taps in a first segment and a second segment according to various embodiments of the present disclosure.

In contrast, FIG. 8B illustrates a CIR sequence with asymmetrical delay taps in a first segment and a second segment according to various embodiments of the present disclosure. The CIR sequence in FIG. 8B for illustration only and includes one or more embodiments described herein.

FIG. 8B illustrates a main leakage peak at delay tap 11. A dashed line is shown at delay tap 11 indicating the difference between a first segment of taps before the main leakage peak and a second segment of taps after the main leakage peak. The CIR sequence includes a first set of delay taps 830 and a second set of delay taps 840. The first set of delay taps 830 includes a delay tap at 10 and a delay tap at 12. The delay tap at 10 is included in the first segment of delay taps and the delay tap at 12 is included in the second segment of delay taps. As illustrated in FIG. 8B, the delay tap at 10 and the delay tap at 12 do not have a similar amplitude, indicated by difference in the PDP [dB]. The delay tap at 10 and the delay tap at 12 are considered to be asymmetrical based on the difference in amplitude. Likewise, the second set of delay taps 840 includes a delay tap at 9 and the delay tap at 13. The delay tap at 9 is included in the first segment of delay taps and the delay tap at 13 is included in the second segment of delay taps. As illustrated in FIG. 8B, the delay tap at 9 and the delay tap at 13 do not have a similar amplitude, indicated by difference in the PDP [dB]. The delay tap at 9 and the delay tap at 13 are considered to be asymmetrical based on the difference in amplitude.

The processor 140 can use a preset or dynamically changed range to determine the specificity of approximately symmetrical. For example, the processor 140 can determine whether an amplitude of delay taps is less than 10 dB, less than 5 dB, less than 3 dB, less than 1 dB, or any other measure to determine whether the first segment and the second segment are symmetrical. In other embodiments, the processor 140 can determine whether an amplitude of delay taps is exactly the same to determine whether the first segment and the second segment are symmetrical.

In various embodiments, each of the delay taps in the first segment and the second segment illustrated in FIG. 8B are considered to be asymmetrical. Accordingly, the processor 140 can determine that the first segment and the second segment are asymmetrical. For example, if the CIR sequence of FIG. 8B is analyzed in operation 620 of FIG. 6, the processor 140 can flip the delay taps of the first segment and determine that the delay taps are asymmetrical to the delay taps of the second segment.

As described in operations 620 and 630, the processor 140 can determine whether the first segment of taps and the second segment of taps are symmetrical by flipping the first segment of delay taps around the main leakage peak and comparing the flipped first segment of delay taps to the second segment of delay taps. As described in FIG. 8B, the processor 140 can determine that the first segment and the second segment are asymmetrical.

Figure 9:
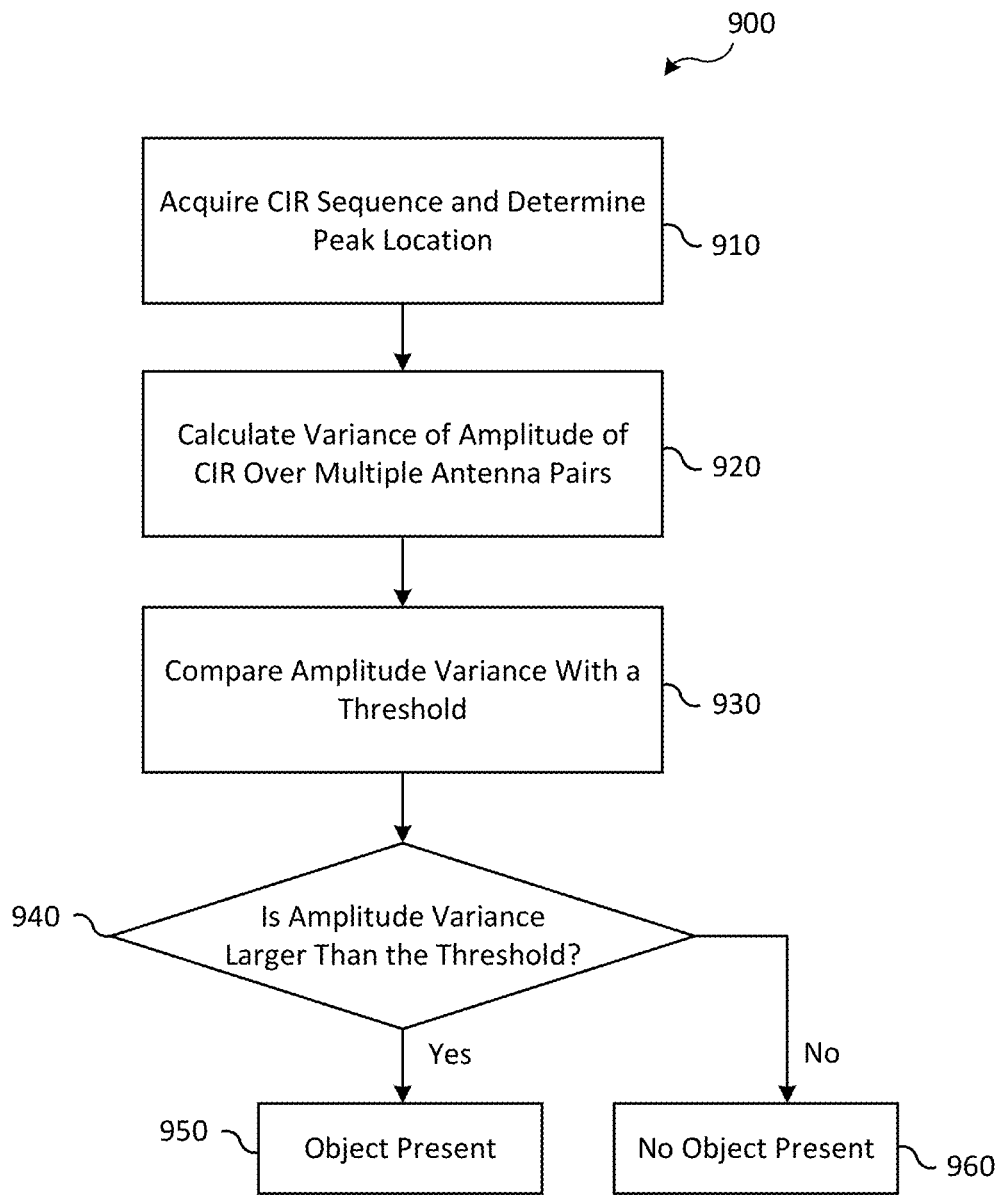
FIG. 9 illustrates an object presence detection method according to various embodiments of the present disclosure.

FIG. 9 illustrates an object presence detection method according to various embodiments of the present disclosure. The method 900 is for illustration only, and includes one or more embodiments described herein. More or fewer steps or operations can be included in method 900.

In operation 910, the processor 140 acquires the CIR sequence and determines a location of the leakage peak in the CIR sequence. In some embodiments, the CIR sequence can be a CIR that is the CIR sequence of FIG. 3 or is similar to the CIR sequence of FIG. 3. The processor 140 can obtain the CIR sequence by analyzing and measuring the reflections of the signals transmitted by the transmitter 157 and received by the receiver 159. Once the CIR sequences are obtained, the processor 140 determines a location of a leakage peak in the CIR sequences. The processor 140 can determine the location of the leakage peak in the CIR sequences based on various methods described herein. In some embodiments, the processor 140 can determine the location of the leakage peak based on the tap that has the greatest amplitude in the CIR sequence. As another example, the processor 140 can determine the leakage peak by searching for the leakage peak in a look-up table that is stored in the memory 160. Because the leakage does not change, the look-up table including leakage peaks for one or more CIR sequences can be saved, or stored, in the memory 160.

In operation 920, the processor 140 collects the amplitude of CIR samples from each of the antenna arrays 155 at the determined leakage peak location. The processor 140 calculates the variance of each of the collected CIR sample amplitudes. In some embodiments, the variance of CIR sample amplitudes at a single tap can be calculated. In other embodiments, the variance of CIR sample amplitudes at some or all taps can be calculated. In some embodiments, the processor 140 can detect a deviation of the signal phase among the CIRs generated for the antenna pairs and determine an object is present based on the deviation among the CIRs.

For example, in operation 930, the processor 140 compares the calculated amplitude variance with a deviation threshold. The deviation threshold can be preset by the processor 140 or can be dynamically determined. In operation 940, the processor 140 determines whether the amplitude variance is larger than the deviation threshold. If the processor 140 determines the amplitude variance is larger than the deviation threshold, the processor 140 proceeds to operation 950 and determines an object is present. If the processor 140 determines the amplitude variance is not larger than the deviation threshold, the processor 140 proceeds to operation 960 and determines no object is present. In some embodiments, based on the processor 140 determining an object is present in operation 950, the processor 140 can then perform further signal processing such as in operation 540.

Figure 10A:
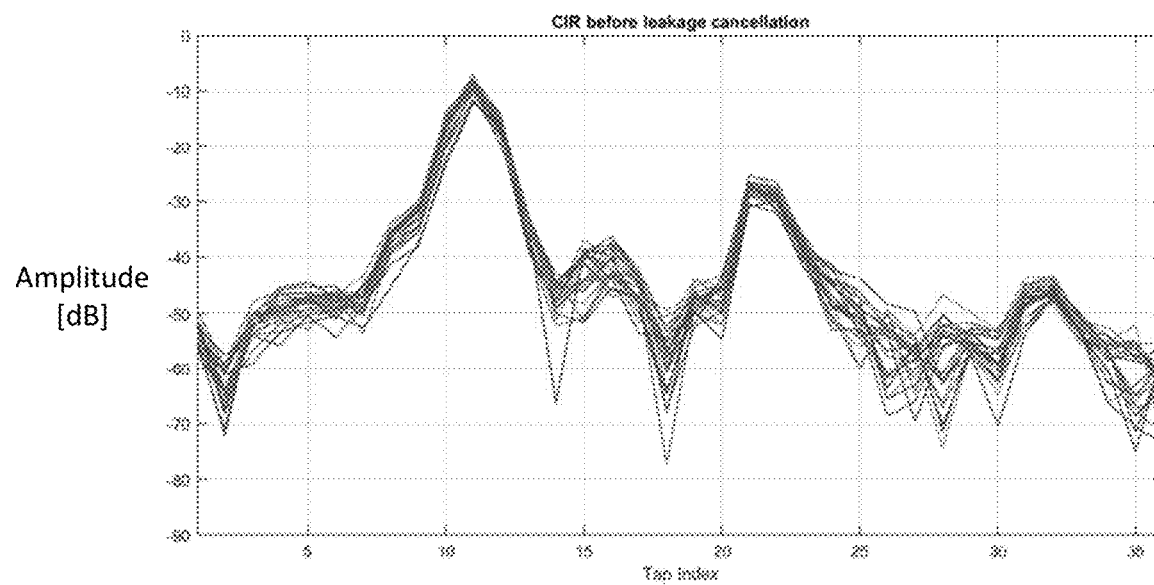
FIG. 10A illustrates a CIR sequence with a small power variation according to various embodiments of the present disclosure.
Figure 10B:
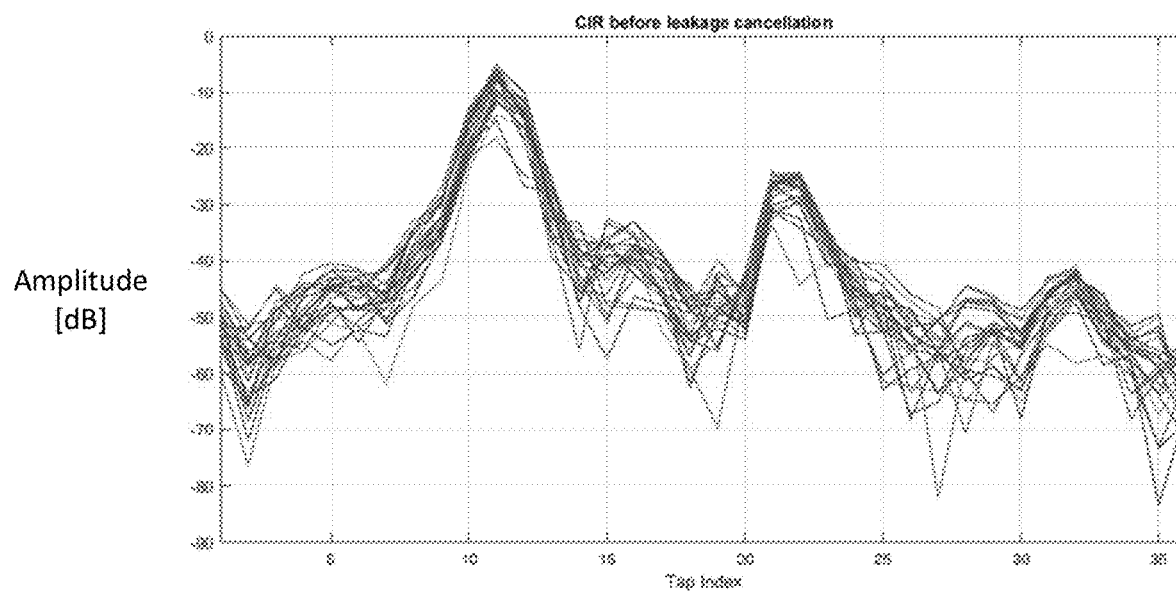
FIG. 10B illustrates a CIR sequence with a large power variation according to various embodiments of the present disclosure.

FIG. 10A illustrates a CIR sequence with a small power variation at the leakage taps according to various embodiments of the present disclosure. FIG. 10B illustrates a CIR sequence with a large power variation according to various embodiments of the present disclosure. Each of FIGS. 10A and 10B illustrate CIR sequences obtained by twenty-five antenna pairs 155 on an electronic device 100, but variation among the antenna pairs 155 can be determined using more of less than twenty-five antenna pairs. In each of FIGS. 10A and 10B, the CIR sequences are illustrated as a function of amplitude [dB] denoted on the y-axis and time (tap index) denoted on the x-axis.

The CIR sequence of FIG. 10A illustrates a small power variation of antenna pairs 155. For example, FIG. 10A illustrates approximately consistent, and therefore a small power variation, CIR sequences for each of the antenna pairs 155. In contrast, FIG. 10B illustrates inconsistent, and therefore a large power variation, CIR sequences for each of the antenna pairs 155. The large power variation shown in FIG. 10B indicates the likelihood of a target in the environment surrounding the electronic device 100. The approximate consistency or inconsistency of the CIR sequences can be quantified by a threshold, for example the threshold described in operation 930. To determine whether a target object is detected, the processor 140 measures, or calculates, the power variation and compares the power variation to the threshold.

Figure 11:
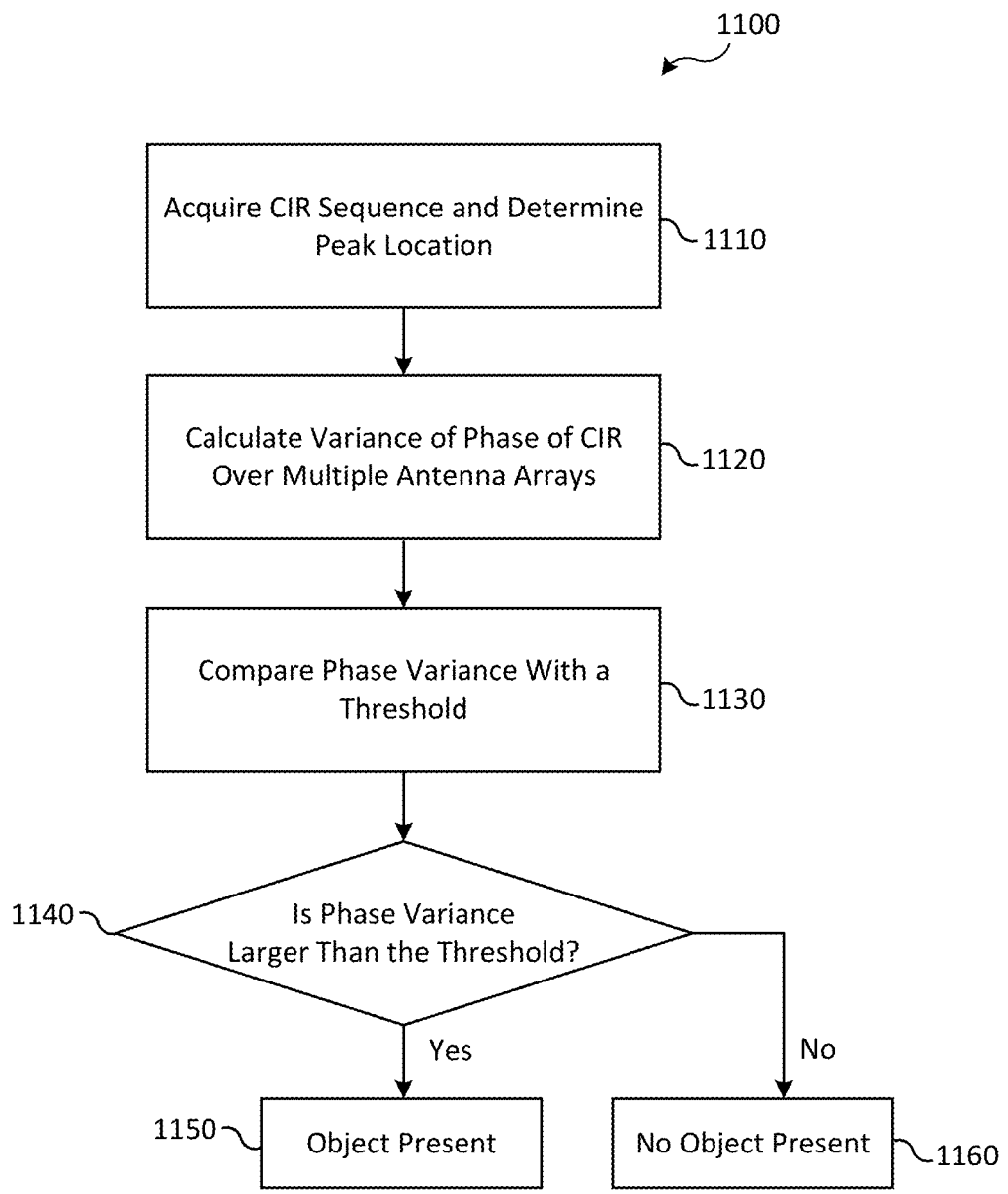
FIG. 11 illustrates an object presence detection method according to various embodiments of the present disclosure.

FIG. 11 illustrates an object presence detection method according to various embodiments of the present disclosure. The method 1100 is for illustration only, and includes one or more embodiments described herein. More or fewer steps or operations can be included in method 1100.

In operation 1110, the processor 140 acquires the CIR sequence and determines a location of the leakage peak in the CIR sequence. In some embodiments, the CIR sequence can be a CIR that is the CIR sequence of FIG. 3 or is similar to the CIR sequence of FIG. 3. The processor 140 can obtain the CIR sequence by analyzing and measuring the reflections of the signals transmitted by the transmitter 157 and received by the receiver 159. Once the CIR sequences are obtained, the processor 140 determines a location of a leakage peak in the CIR sequences. The processor 140 can determine the location of the leakage peak in the CIR sequences based on various methods described herein. In some embodiments, the processor 140 can determine the location of the leakage peak based on the tap that has the greatest amplitude in the CIR sequence. As another example, the processor 140 can determine the leakage peak by searching for the leakage peak in a look-up table that is stored in the memory 160. Because the leakage does not change, the look-up table including leakage peaks for one or more CIR sequences can be saved, or stored, in the memory 160.

In operation 1120, the processor 140 collects the phase of CIR samples from each of the antenna arrays 155 at the determined leakage peak location. The processor 140 calculates the phase of each of the collected CIR sample phase. In some embodiments, the variance of CIR sample phases at a single tap can be calculated. In other embodiments, the variance of CIR sample phases at some or all taps can be calculated. In some embodiments, the processor 140 can detect a deviation of signal power, or amplitude, among the CIRs generated for the antenna pairs and determine an object is present based on the deviation among the CIRs.

For example, in operation 1130, the processor 140 compares the calculated phase variance with a threshold. The threshold can be preset by the processor 140 or can be dynamically determined. In operation 1140, the processor 140 determines whether the phase variance is larger than the threshold. If the processor 140 determines the phase variance is larger than the threshold, the processor 140 proceeds to operation 1150 and determines an object is present. If the processor 140 determines the phase variance is not larger than the threshold, the processor 140 proceeds to operation 1160 and determines no object is present. In some embodiments, based on the processor 140 determining an object is present in operation 1150, the processor 140 can then perform further signal processing such as in operation 540.

Figure 12:
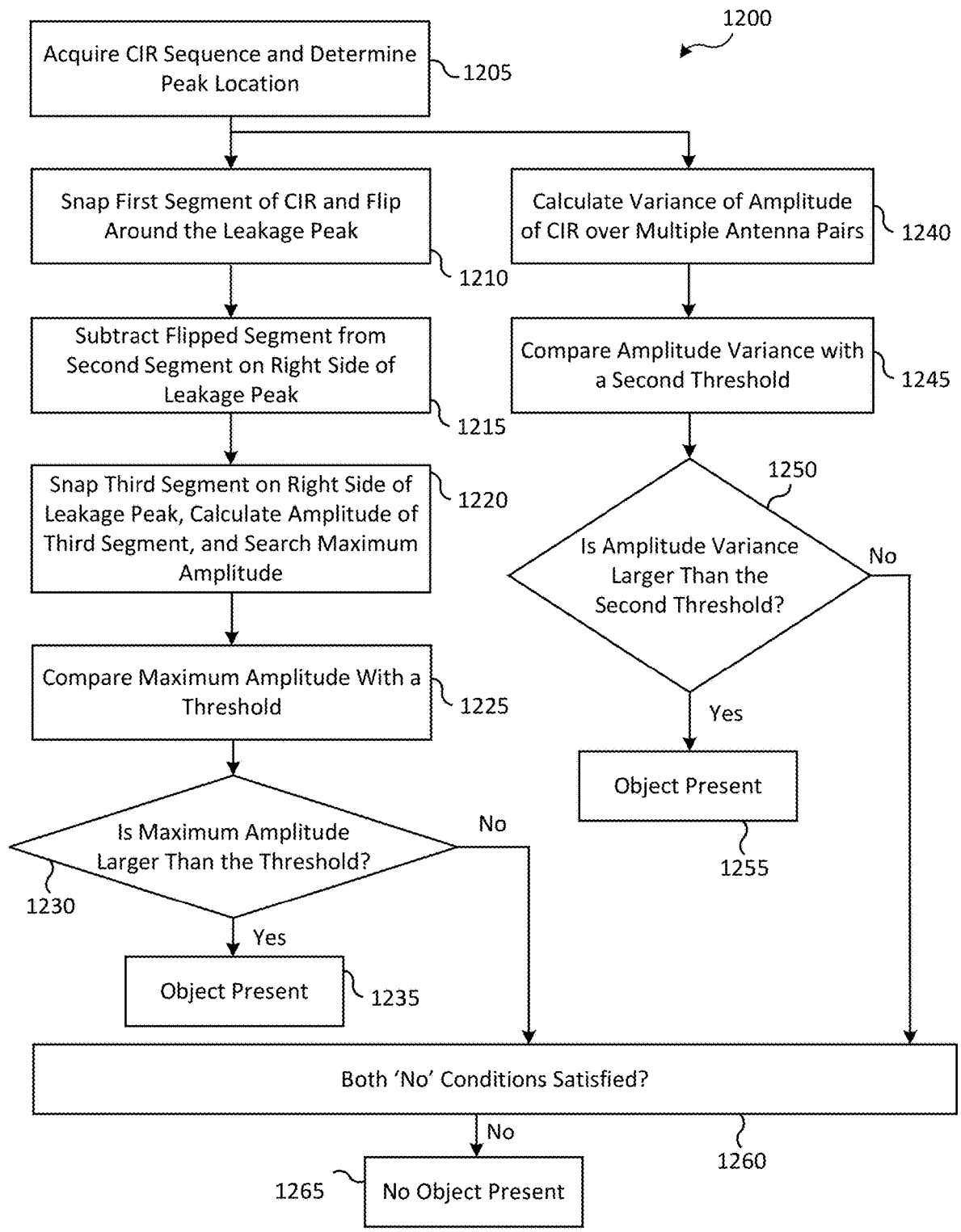
FIG. 12 illustrates a method of object detection according to various embodiments of the present disclosure.

Although various methods for detecting whether an object is present are described separately herein, various methods can be used together and in combination to achieve a greater confidence in the determination that an object is present or not present. For example, FIG. 12 illustrates a method that combines multiple methods of object detection that can be utilized separately as well as in combination according to various embodiments described herein. For example, the method 1200 illustrates how the method 600 and the method 900 can be used in combination to more accurately and robustly detect the presence of an object. The method 1200 is for illustration only, and includes one or more embodiments described herein. More or fewer steps or operations can be included in method 1200.

In operation 1205, the processor 140 acquires the CIR sequence and determines a location of the leakage peak in the CIR sequence. In some embodiments, the CIR sequence can be a CIR that is the CIR sequence of FIG. 3 or is similar to the CIR sequence of FIG. 3. The processor 140 can obtain the CIR sequence by analyzing and measuring the signal transmitted by the transmitter 157 and received by the receiver 159. Once the CIR sequence is obtained, the processor 140 determines a location of a leakage peak in the CIR sequence. The processor 140 can determine the location of the leakage peak in the CIR sequence based on various methods described herein. For example, the processor 140 can determine the location of the leakage peak based on the tap that has the greatest amplitude in the CIR sequence. As another example, the processor 140 can determine the leakage peak by searching for the leakage peak in a look-up table that is stored in the memory 160. Because the leakage does not change, the look-up table including leakage peaks for one or more CIR sequences can be saved, or stored, in the memory 160.

In operation 1210, the processor 140 snaps the first segment of a CIR sequence and flips the first segment around the identified leakage peak. For example, as described in operation 620, the result of the flipping operation $C'_{t+n}$ can be defined by Equation 6: $C'_{t+n}=C_{t-n}$; n=0, 1, . . . , $N_1$. For example, when the main leakage peak is identified at delay tap 11 and the width of the segment, $N_1$, is identified as two, the processor 140 can flip delay taps 9 and 10 around the leakage peak at delay tap 11 so the delay taps 9 and 10 are overlaid on delay taps 13 and 12, respectively.

In operation 1215, the processor 140 subtracts the first segment from the right side of the leakage peak, for example from the second segment of delay taps. For example, as described in operation 630, when the width of the segment, $N_1$, is identified as two, the processor 140 subtracts the amplitude of delay tap 9 from the amplitude of delay tap 13 and subtracts the amplitude of delay tap 10 from the amplitude of delay tap 12.

In operation 1220, the processor 140 snaps a third segment on the right side of the leakage peak, calculates the amplitude of the third segment, and searches for the maximum amplitude of the third segment after the cancelation of the first segment from the second segment. For example, the processor 140 can identify and isolate the delay taps included in the third segment that are on the right side of the main leakage peak, calculate the amplitude of the second segment of delay taps, and determines the maximum amplitude. In various embodiments, the first segment can correspond to the first segment 710, the second segment can correspond to the second segment 720, and the identified and isolated delay taps can correspond to the third segment 730.

In operation 1225, the processor 140 compares the searched maximum amplitude to a threshold. The threshold can be preset by the processor 140 or can be dynamically determined.

In operation 1230, based on the comparison in operation 1225, the processor 140 determines whether the maximum amplitude is larger than the threshold. If the maximum amplitude is larger than the threshold, the processor 140 proceeds to operation 1235 and determines an object is present. If the maximum amplitude is not larger than the threshold, the processor 140 determines whether a 'no' condition in operation 1250 is also satisfied.

In some embodiments, the threshold in operation 1230 can be described as the predefined symmetry threshold. For example, the processor 140 can determine the level of symmetry between the first segment of taps and the second segment of taps and determine whether the level of symmetry is inside or outside of the predefined symmetry threshold. Accordingly, the processor 140 can determine that an object is present based on the symmetry between the first segment of taps and the second segments of taps being outside of the predefined symmetry threshold. The processor 140 can determine that an object is unlikely to be present based on the symmetry between the first segment of taps and the second segments of taps being inside of the predefined symmetry threshold.

The processor 140 can additionally perform operations 1240-1255 before performing operations 1210-1235, after performing operations 1210-1235, or simultaneously while performing operations 1210-1235. In operation 1240, the processor 140 calculates the variance of the CIRs over multiple antenna pairs. For example, as described in operation 920, the processor 140 collects the amplitude of CIR samples from each of the antenna arrays 155 at the determined leakage peak location. The processor 140 calculates the variance of each of the collected CIR sample amplitudes. In some embodiments, the variance of CIR sample amplitudes at a single tap can be calculated. In other embodiments, the variance of CIR sample amplitudes at some or all taps can be calculated.

In operation 1245, the processor compares the amplitude variance with a deviation threshold. The deviation threshold can be preset by the processor 140 or can be dynamically determined. In operation 1250, the processor 140 determines whether the amplitude variance is larger than the deviation threshold. If the processor 140 determines the amplitude variance is larger than the deviation threshold, the processor 140 proceeds to operation 1255 and determines an object is present. If the processor 140 determines the amplitude variance is not larger than the deviation threshold, the processor 140 determines whether a 'no' condition in operation 1230 is also satisfied.

In operation 1260, based on the 'no' condition of operation 1230 and the 'no' condition of operation 1250 each being satisfied, the processor 140 proceeds to operation 1265 and determines that no object is present in the surrounding environment of the electronic device 100. The final detection results can be obtained using a simple logical rule such as an OR operation or by simply selecting the result of the branch with a higher estimate of the confidence level. Different metrics can be used as the confidence level. For instance, the normalized gap at the detected tap to the detection threshold can be used. By combining each of the independent mechanisms for object detection previously described in FIGS. 6 and 9, the processor 140 can more accurately and robustly detect the presence of a potential object than if only one mechanism is used.

Figure 13:
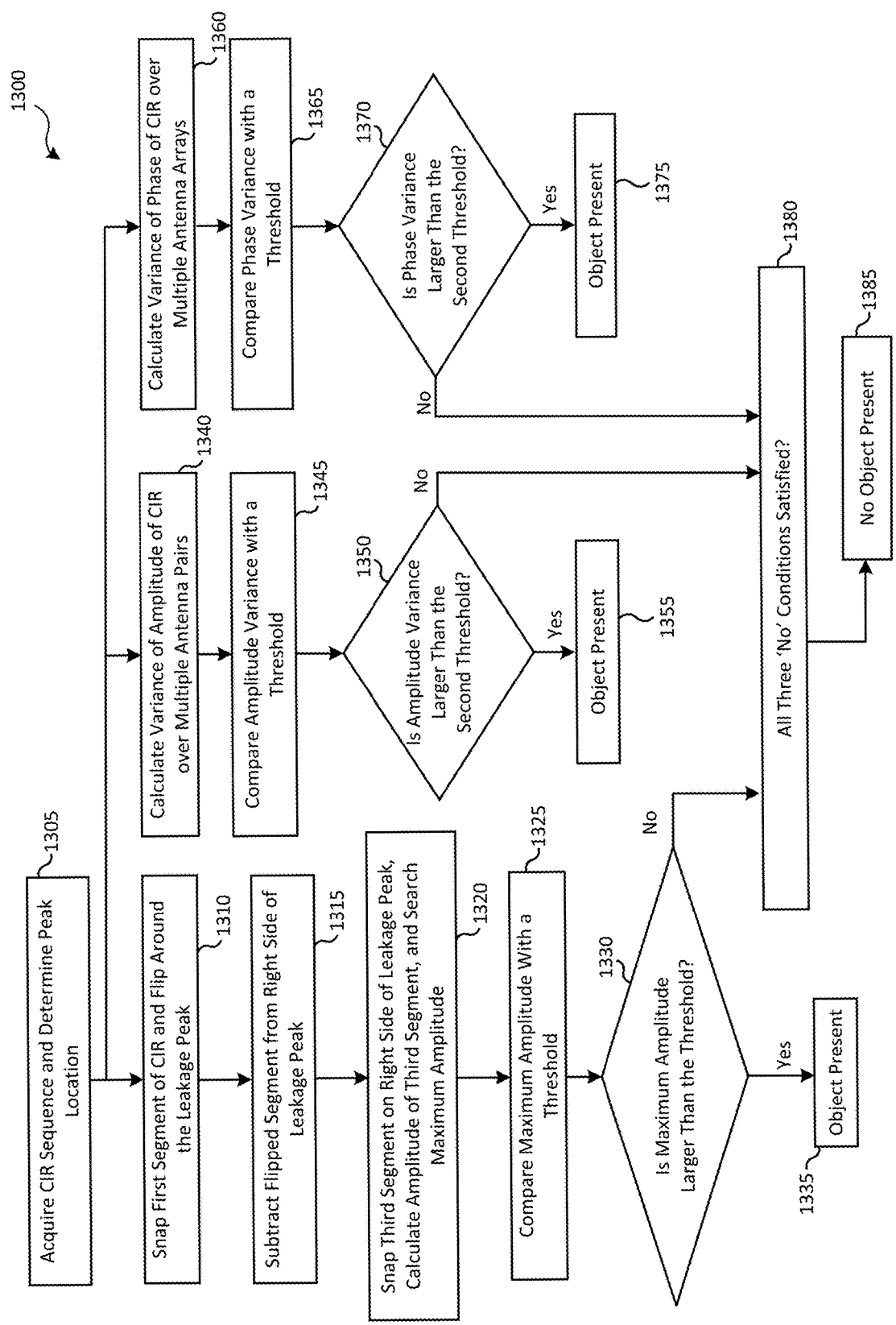
FIG. 13 illustrates a method of object detection according to various embodiments of the present disclosure.

As another example, FIG. 13 illustrates a method that combines multiple methods of object detection that can be utilized separately as well as in combination according to various embodiments described herein. The method 1300 illustrates how the method 600, the method 900, and the method 1100 can be used in combination to more accurately and robustly detect the presence of an object. The method 1300 is for illustration only, and includes one or more embodiments described herein. More or fewer steps or operations can be included in method 1300. Operations 1305-1355 of method 1300 can be the same as operations 1205-1255 of method 1200.

In operation 1305, the processor 140 acquires the CIR sequence and determines a location of the leakage peak in the CIR sequence. In some embodiments, the CIR sequence can be a CIR that is the CIR sequence of FIG. 3 or is similar to the CIR sequence of FIG. 3. The processor 140 can obtain the CIR sequence by analyzing and measuring the signal transmitted by the transmitter 157 and received by the receiver 159. Once the CIR sequence is obtained, the processor 140 determines a location of a leakage peak in the CIR sequence. The processor 140 can determine the location of the leakage peak in the CIR sequence based on various methods described herein. For example, the processor 140 can determine the location of the leakage peak based on the tap that has the greatest amplitude in the CIR sequence. As another example, the processor 140 can determine the leakage peak by searching for the leakage peak in a look-up table that is stored in the memory 160. Because the leakage does not change, the look-up table including leakage peaks for one or more CIR sequences can be saved, or stored, in the memory 160.

In operation 1310, the processor 140 snaps the first segment of a CIR sequence and flips the first segment around the identified leakage peak. For example, as described in operation 620, the result of the flipping operation $C'_{t+n}$ can be defined by Equation 6: $C'_{t+n} = C_{t-n}$; $n = 0, 1, \ldots, N_1$. For example, when the main leakage peak is identified at delay tap 11 and the width of the segment, $N_1$, is identified as two, the processor 140 can flip delay taps 9 and 10 around the leakage peak at delay tap 11 so the delay taps 9 and 10 are overlaid on delay taps 13 and 12, respectively.

In operation 1315, the processor 140 subtracts the first segment from the right side of the leakage peak, for example from the second segment of delay taps. For example, as described in operation 630, when the width of the segment, $N_1$, is identified as two, the processor 140 subtracts the amplitude of delay tap 9 from the amplitude of delay tap 13 and subtracts the amplitude of delay tap 10 from the amplitude of delay tap 12.

In operation 1320, the processor 140 snaps a third segment on the right side of the leakage peak, calculates the amplitude of the third segment, and searches for the maximum amplitude after the cancelation of the first segment from the second segment. For example, the processor 140 can identify and isolate the delay taps included in the third segment that are on the right side of the main leakage peak, calculate the amplitude of the second segment of delay taps, and determines the maximum amplitude. In various embodiments, the first segment can correspond to the first segment 710, the second segment can correspond to the second segment 720, and the identified and isolated delay taps can correspond to the third segment 730.

In operation 1325, the processor 140 compares the searched maximum amplitude to a threshold. The threshold can be preset by the processor 140 or can be dynamically determined.

In operation 1330, based on the comparison in operation 1325, the processor 140 determines whether the maximum amplitude is larger than the threshold. If the maximum amplitude is larger than the threshold, the processor 140 proceeds to operation 1335 and determines an object is present. If the maximum amplitude is not larger than the threshold, the processor 140 determines whether 'no' conditions in operations 1350 and 1370 are also satisfied.

In some embodiments, the threshold in operation 1330 can be described as the predefined symmetry threshold. For example, the processor 140 can determine the level of symmetry between the first segment of taps and the second segment of taps and determine whether the level of symmetry is inside or outside of the predefined symmetry threshold. Accordingly, the processor 140 can determine that an object is present based on the symmetry between the first segment of taps and the second segments of taps being outside of the predefined symmetry threshold. The processor 140 can determine that an object is unlikely to be present based on the symmetry between the first segment of taps and the second segments of taps being inside of the predefined symmetry threshold.

In operation 1340, the processor 140 calculates the variance of the CIRs over multiple antenna pairs. For example, as described in operation 920, the processor 140 collects the amplitude of CIR samples from each of the antenna pairs 155 at the determined leakage peak location. The processor 140 calculates the variance of each of the collected CIR sample amplitudes. In some embodiments, the variance of CIR sample amplitudes at a single tap can be calculated. In other embodiments, the variance of CIR sample amplitudes at some or all taps can be calculated.

In operation 1345, the processor compares the amplitude variance with a deviation threshold. The deviation threshold can be preset by the processor 140 or can be dynamically determined. In operation 1350, the processor 140 determines whether the amplitude variance is larger than the deviation threshold. If the processor 140 determines the amplitude variance is larger than the deviation threshold, the processor 140 proceeds to operation 1355 and determines an object is present. If the processor 140 determines the amplitude variance is not larger than the deviation threshold, the processor 140 determines whether 'no' conditions in operations 1330 and 1370 are also satisfied.

In operation 1360, the processor 140 collects the phase of CIR samples from each of the antenna pairs 155 at the determined leakage peak location. The processor 140 calculates the phase of each of the collected CIR sample phase. In some embodiments, the variance of CIR sample phases at a single tap can be calculated. In other embodiments, the variance of CIR sample phases at some or all taps can be calculated.

In operation 1365, the processor 140 compares the phase variance with a deviation threshold. The deviation threshold can be preset by the processor 140 or can be dynamically determined. In operation 1370, the processor 140 determines whether the phase variance is larger than the deviation threshold. If the processor 140 determines the phase variance is larger than the deviation threshold, the processor 140 proceeds to operation 1375 and determines an object is present. If the processor 140 determines the phase variance is not larger than the deviation threshold, the processor 140 determines whether 'no' conditions in operations 1330 and 1350 are also satisfied.

In various embodiments, the processor 140 can perform operations 1310-1335, 1340-1355, and 1360-1375 simultaneously or in succession in any order. For example, the processor 140 can perform operations 1310-1335, then operations 1340-1355, and then operations 1360-1375. As another example, the processor can perform operations 1360-1375, then operations 1340-1355, and then operations 1310-1335.

In operation 1380, based on the 'no' condition of operations 1330, 1350, and 1370 each being satisfied, the processor 140 proceeds to operation 1385 and determines no object is present in the surrounding environment of the electronic device 100. The final detection results can be obtained using a simple logical rule such as an OR operation or by simply selecting the result of the branch with a higher estimate of the confidence level. Different metrics can be used as the confidence level. For instance, the normalized gap at the detected tap to the detection threshold can be used. By combining each of the independent mechanisms for object detection previously described in FIGS. 6, 9, and 11, the processor 140 can more accurately and robustly detect the presence of a potential object than if only one mechanism is used.

Figure 14:
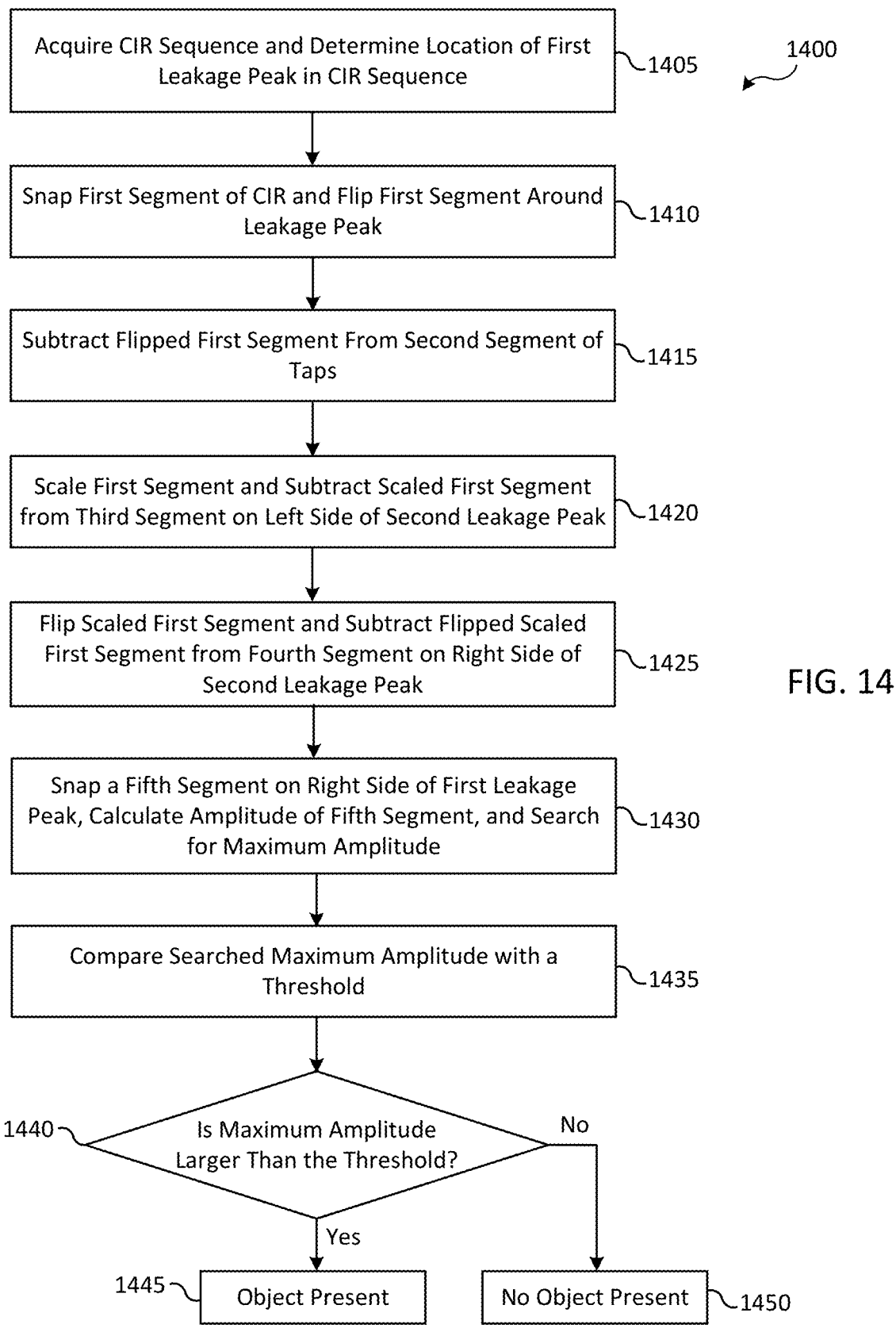
FIG. 14 illustrates a method of object presence detection based on the existence of multiple leakage peaks according to various embodiments of the present disclosure.

In various embodiments, the transceiver 110 can produce more than one leakage peak in a CIR. For example, multiple leakage peaks can be produced based on cable reflection. The distance between each of the leakage peaks can be affected by various factors such as the distance between the transmitter 157 and the receiver 159, the length of the RF or intermediate frequency (IF) cables that connect the antenna array or arrays 155 and the baseband chipset, or other factors. In instances where multiple leakage peaks are detected, additional methods of object detection can be used. FIG. 14 illustrates a method 1400 of object presence detection based on the existence of multiple leakage peaks according to various embodiments of the present disclosure. The method 1400 is for illustration only, and includes one or more embodiments described herein. More or fewer steps or operations can be included in method 1400.

In operation 1405, the processor 140 acquires the CIR sequence and determines a location of the leakage peaks in the CIR sequence. For example, the processor 140 can determine the location of a first leakage peak and a second leakage peak in the CIR sequence. Although described herein as including a first leakage peak and a second leakage peak, this embodiment should not be construed as limiting. The CIR sequence can contain any number of leakage peaks. In determining the location of the leakage peaks, the processor 140 further measures the fixed connection between each leakage peak. The fixed connection can be measured as a distance, for example the delay taps in the CIR. In some embodiments, the CIR sequence can be a CIR that is the CIR sequence of FIG. 3 or is similar to the CIR sequence of FIG. 3.

The processor 140 can obtain the CIR sequence by analyzing and measuring the signal transmitted by the transmitter 157 and received by the receiver 159. Once the CIR sequence is obtained, the processor 140 determines a location of the first leakage peak in the CIR sequence. The processor 140 can determine the location of the first leakage peak in the CIR sequence based on various methods described herein. For example, the processor 140 can determine the location of the first leakage peak based on the tap that has the greatest amplitude in the CIR sequence. As another example, the processor 140 can determine the leakage peak by searching for the leakage peak in a look-up table that is stored in the memory 160. Because the leakage does not change, the look-up table including leakage peaks for one or more CIR sequences can be saved, or stored, in the memory 160.

In operation 1410, the processor 140 snaps a first segment of the CIR that is before, i.e. on the left side of, the first leakage peak and flips the first segment of the first leakage peak around the identified first leakage peak. For example, as described in operation 620, the result of the flipping operation $C'_{t+n}$ can be defined by Equation 6: $C'_{t+n}=C_{t-n}$; n=0, 1, ..., $N_1$. For example, when the first leakage peak is identified at delay tap 11 and the width of the segment, $N_1$, is identified as two, the processor 140 can flip delay taps 9 and 10 around the first leakage peak at delay tap 11 so the delay taps 9 and 10 are overlaid on delay taps 13 and 12, respectively.

In operation 1415, the processor 140 subtracts the first segment of the first leakage peak from the right side of the first leakage peak, for example from the second segment of delay taps of the first leakage peak. For example, as described in operation 630, when the width of the segment, $N_1$, is identified as two, the processor 140 subtracts the amplitude of delay tap 9 from the amplitude of delay tap 13 and subtracts the amplitude of delay tap 10 from the amplitude of delay tap 12.

In operation 1420, the processor 140 scales the first segment of the first leakage peak by a constant number. The constant number can be predefined, based on the distance between the first leakage peak and the second leakage peak, or be dynamically determined by the processor 140 based on various other factors. The processor 140 then subtracts the scaled first segment of the first leakage peak from a first segment of the second leakage peak, which can also be described as a third segment. The first segment of the second leakage peak includes the delays taps before, i.e. on the left side of, the second leakage peak.

In operation 1425, the processor 140 flips the scaled first segment of the first leakage peak and subtracts the flipped and scaled first segment of the first leakage peak from a second segment of the second leakage peak, which can also be described as a fourth segment. The fourth segment of the second leakage peak includes the delay taps after, i.e. on the right side of, the second leakage peak.

In operation 1430, the processor 140 snaps a fifth segment, which is a segment of delay taps to the right of, i.e. immediately after, the first leakage peak. The length of the fifth segment is determined by a distance which is targeted for detecting objects. After the length of the fifth segment is determined, the processor 140 determines an amplitude of the fifth segment.

In operation 1435, processor 140 compares the searched for maximum amplitude with a threshold. The threshold can be preset by the processor 140 or can be dynamically determined. In operation 1440, based on the comparison in operation 1435, the processor 140 determines whether the searched for maximum amplitude is larger than the threshold. If the searched for maximum amplitude is larger than the threshold, the processor 140 proceeds to operation 1445 and determines an object is present. In other words, the processor 140 determines an object is present based on an inconsistency between amplitudes of delay taps of the first leakage peak and delay taps of the second leakage peak. If the searched for maximum amplitude is not larger than the threshold, the processor 140 proceeds to operation 1450 and determines no object is present. In some embodiments, based on the processor 140 determining an object is present in operation 1445, the processor 140 can then perform further signal processing, such as described in operation 540.

Figure 15:
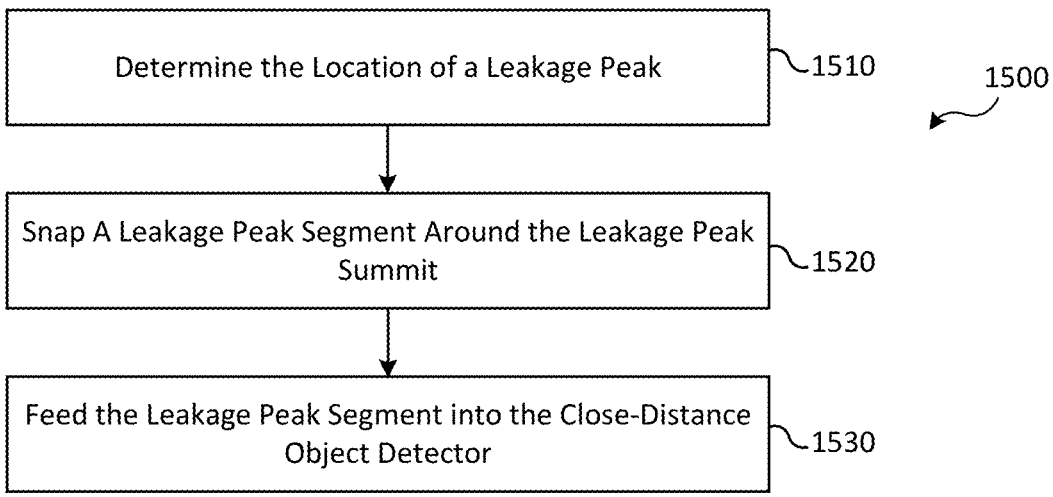
FIG. 15 illustrates a method of object detection according to various embodiments of the present disclosure.

FIG. 15 illustrates a method of object detection according to various embodiments of the present disclosure. The method 1500 is for illustration only, and includes one or more embodiments described herein. More or fewer steps or operations can be included in method 1500. The method 1500 uses the known properties of the leakage signal, that does not contain a target, to apply a learning-based approach to object detection rather than signal processing. For example, the method 1500 can be implemented in machine learning classification algorithms that are used in the learning-based approach.

In operation 1510, the processor 140 determines the location of a leakage peak. The location of the leakage peak can include information detailing the location of the maximum leakage peak in a CIR sequence. The processor 140 can determine the location of the leakage peak by various methods. In some embodiments, the processor 140 can read the location of the leakage peak from a lookup table stored in the memory 160 that contains saved leakage information. The lookup table can store leakage peak information for each respective antenna pairs or arrays 155 to be retrieved and read. In other embodiments, the processor 140 can detect the leakage peak in real-time operation as described in various embodiments herein, such as through maximum CIR detection.

In operation 1520, the processor 140 snaps a leakage peak segment. The snapped leakage peak segment can include two CIR sample boundaries, such as the left and right boundary, of the CIR sequence. The length of the boundaries is determined by the range within which object detection is being performed. For example, if the main leakage peak is identified at delay tap 11 and the length of the boundaries is identified as three delay taps, the left boundary includes delay taps 8, 9, and 10 and the right boundary includes delay taps 12, 13, and 14. For example, based on the method 1500 being implemented in a learning-based approach, the relevant information in the leakage signal is found in the CIR near the leakage peak. Therefore, the processor 140 can direct the learning to be conducted using the CIRs near the leakage peak to achieve more accurate learning and object detection.

In operation 1530, the processor 140 feeds the snapped leakage peak segment into a close-distance object detector. In various embodiments, the close-distance object detector can be in a linear form or a non-linear form. The close-distance object detector can utilize various methods of detecting an object. In some embodiments, the close-distance object detector can be an application 164 that is stored in the memory 160.

For example, the processor 140 can control the close-distance object detector to use a K Nearest Neighbor (KNN) method to detect an object. The KNN method can be performed by an application 164 that is stored in the memory 160. The KNN method consists of a training stage and a prediction stage. In the training data collection stage, the processor 140 controls to measure two types of leakage peak segments, segments without objects detected and segments with objects detected. In the prediction stage, the processor 140 controls the close-distance object detector to feed the leakage peak segment obtained in real time into the trained KNN classifier. With the input of the real-time leakage peak segment, the output of the KNN classifier indicates whether the object is present or not.

In other embodiments, the processor 140 can utilize a neural network to determine the presence or absence of an object. The neural network based detection method consists of two stages, a training and prediction stage, that are similar to the stages of the KNN method described herein. However, these embodiments should not be construed as limiting and any binary classifier application 164 can be used to detect the presence or absence of an object.

Figure 16:
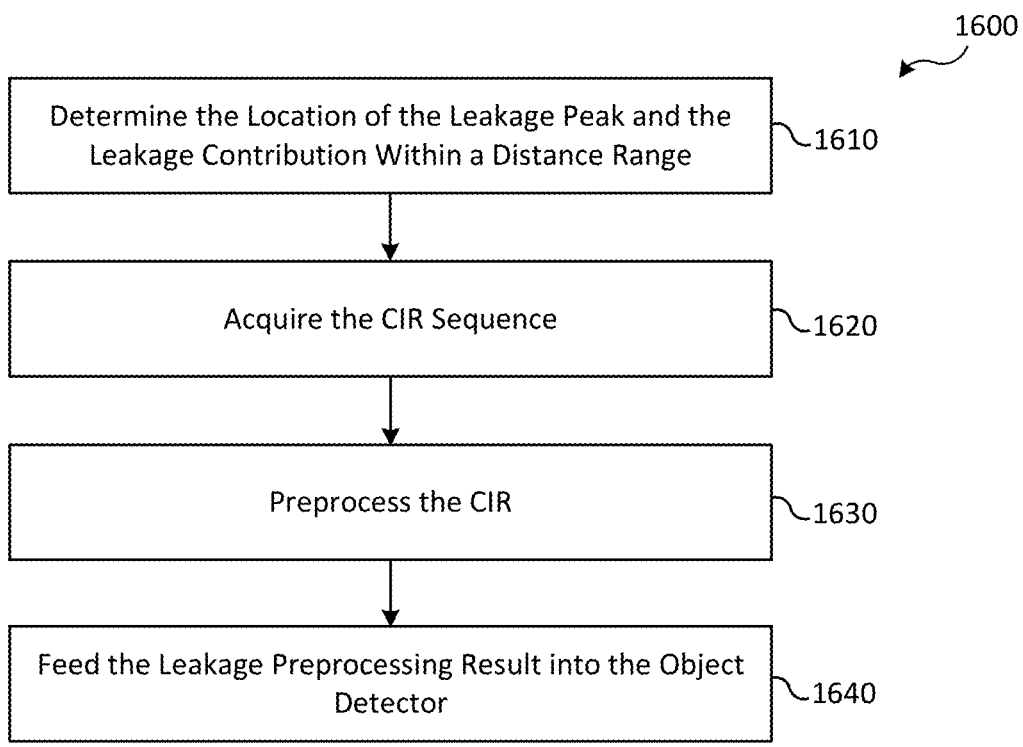
FIG. 16 illustrates another method of object detection according to various embodiments of the present disclosure.

FIG. 16 illustrates another method of object detection according to various embodiments of the present disclosure. The method 1600 is for illustration only, and includes one or more embodiments described herein. More or fewer steps or operations can be included in method 1600.

In operation 1610, the processor 140 determines the location of a leakage peak and a leakage contribution within a distance range. The location of the leakage peak and the leakage contribution within the distance range can be determined based on reading from a lookup table stored in a memory 160 that includes previous leakage contributions or a calculation based on the distance range within which the presence of a target object is to be determined. For example, the processor 140 can send a notice to a user to keep a field of view clear immediately before the detection of a target object is to be performed. Following the field of view being cleared, the leakage information can be collected.

In operation 1620, the processor 140 acquires the CIR sequence. The acquired CIR sequence is a measurement of the current environment for detecting whether an object is near the antenna pairs 155. The acquired CIR includes the leakage contribution and an object reflection if an object is present in the field of view.

In operation 1630, the processor 140 conducts preprocessing of the CIR. For example, the CIR cancelation can include subtracting the leakage contribution from the generated CIR. By subtracting, or canceling, the leakage contribution from the generated CIR, the preprocessed CIR does not contain the leakage contribution and provide a cleaner signal to more clearly identify peaks that correspond to a target object.

In operation 1640, the processor 140 feeds the preprocessed CIR into the object detector and performs object detection. For example, the object detector can be an application 164 that is stored in the memory 160. The object detector can perform object detection based on various methods. In some embodiments, the object detector can detect the maximum value of the cancelation result performed in operation 1630 and compare the detected maximum value to a predefined threshold value. The object detector can consider an object detected based on the maximum value being larger than the threshold and can consider an object not to be detected based on the maximum value being less than the threshold.

In other embodiments, the object detector can utilize non-linear methods of detecting an object. For example, the processor 140 can control the object detector to perform the KNN method described herein, the neural network described herein, or any other binary method of classification to determine whether an object is present or not present.

Various embodiments of the present disclosure estimate the distance of a detected target from the electronic device 100. Radar systems utilize the time of flight to estimate distance, which measures the time offset between the time instance signal being transmitted by the transmitter 157 and the instance the reflection being received by the receiver 159. The range is estimated based on the measured time offset. This method is less accurate when a strong RF leakage is present between the transmitter 157 and the receiver 159. Therefore, more reliable methods of distance estimation are needed for instances with strong RF leakage.

Figure 17:
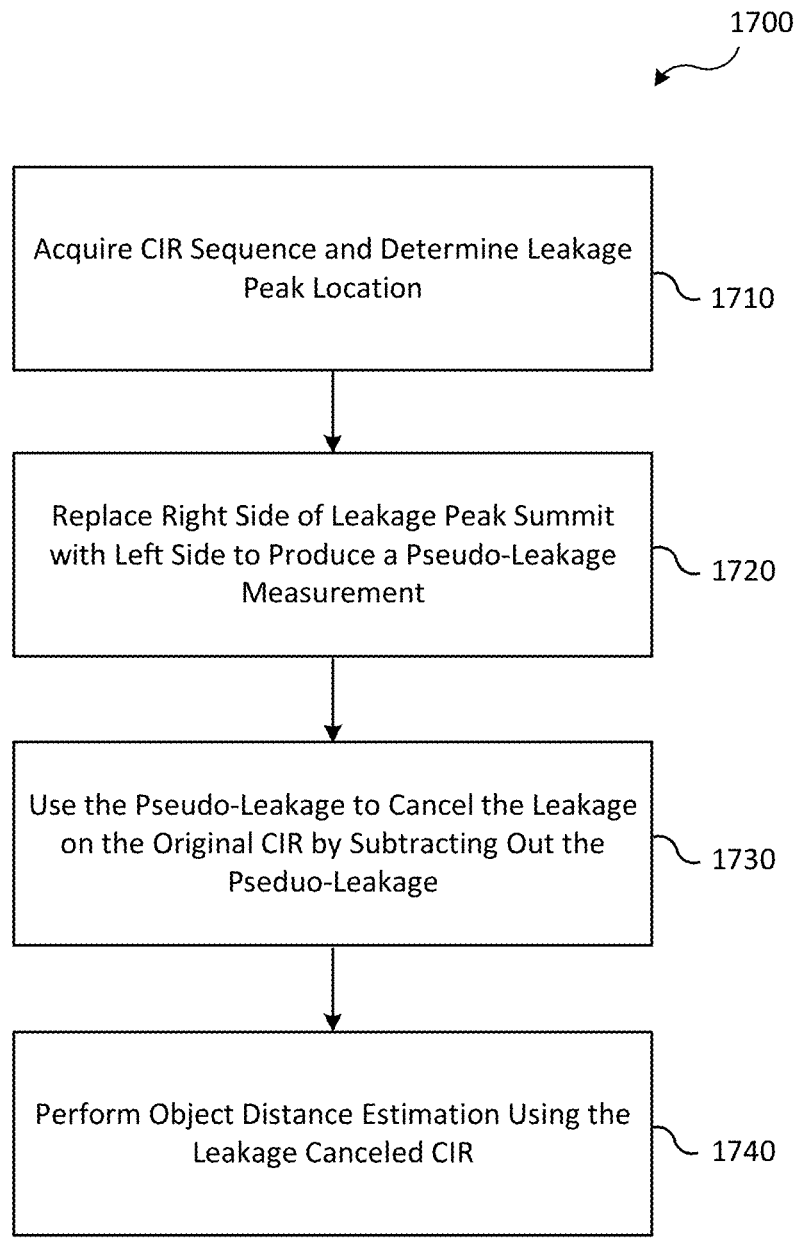
FIG. 17 illustrates a method of object detection and distance estimation according to various embodiments of the present disclosure.

FIG. 17 illustrates a method of object detection and distance estimation according to various embodiments of the present disclosure. The method 1700 is for illustration only, and includes one or more embodiments described herein. More or fewer steps or operations can be included in method 1700.

In operation 1710, the processor 140 acquires the CIR sequence and determines the location of the leakage peak. The location of the summit of the leakage peak can be determined within taps that correspond to the distance range within which an object is to be detected. In some embodiments, the location of the leakage peak can be pre-measured and stored in the memory 160, for example in a lookup table, to be read by the processor 140 when the location is used for distance estimation. In other embodiments, the leakage peak location can be determined in real time based on various methods described herein. In these embodiments, the processor 140 can search for the maximum power CIR and designate the location of the leakage peak summit at the index of the maximum CIR.

In operation 1720, the processor 140 replaces the right side of the leakage peak summit with the left side of the leakage peak summit to produce a pseudo-leakage measurement. In particular, the processor 140 copies the left side of the CIR sample or samples within a threshold, for example three delay taps immediately to the left of the main leakage peak. The processor 140 flips the copied three delay taps from the left side and replaces the right side of the leakage peak summit, for example the three delay taps immediately to the right of the main leakage peak, while maintaining the three delay taps immediately to the left of the main leakage peak. The output of replacing the right side of the CIR samples can be referred to as pseudo leakage.

For example, the processor 140 can identify, in operation 1710, the main leakage peak location at delay tap 11. In operation 1720, the processor 140 can copy the delay taps 8, 9, and 10 immediately preceding the main leakage peak location, flip the delay taps 8, 9, and 10, and replace the delay taps 14, 13, and 12, respectively. Simultaneously, the processor 140 maintains the delay taps 8, 9, and 10 immediately preceding the main leakage peak at delay tap 11.

In operation 1730, the processor 140 subtracts out the pseudo-leakage measurement determined in operation 1720 to cancel the leakage of the original CIR. In operation 1740, the processor 140 uses the leakage canceled CIR obtained in operation 1730 to perform object distance estimation. In particular, the processor 140 uses the pseudo leakage to cancel the leakage from the CIR that contains both the leakage and the object reflection. Canceling the leakage from the CIR results in a leakage canceled CIR that contains the object reflection without the leakage, which estimates the location of the target object. Following the leakage cancelation, the processor 140 can perform distance estimation on the detected object using, for example, the method 1800 described in FIG. 18.

Figure 18:
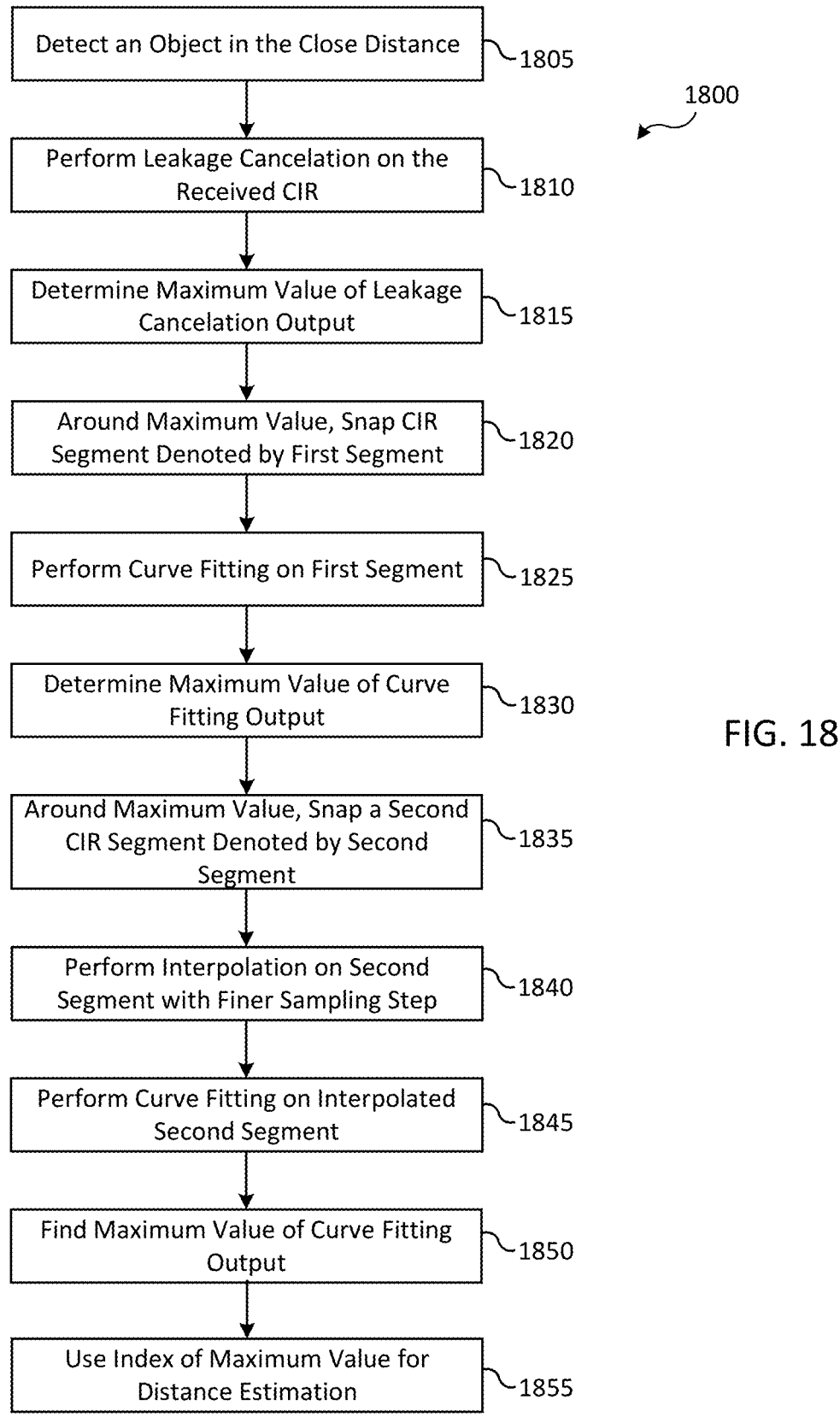
FIG. 18 illustrates a method of object detection and distance estimation according to various embodiments of the present disclosure.

FIG. 18 illustrates a method of object detection and distance estimation according to various embodiments of the present disclosure. The method 1800 is for illustration only, and includes one or more embodiments described herein. More or fewer steps or operations can be included in method 1800. The method 1800 assumes the leakage is known by the processor 140. For example, the leakage can be determined, prior to the method 1800 being performed, by various embodiments described herein.

In operation 1805, the processor 140 detects an object within a close distance of the electronic device 100. In some embodiments, the object can be detected within 10 cm of the electronic device 100. In some embodiments, the object can be detected within 5 cm of the electronic device 100.

In operation 1810, the processor 140 performs leakage cancelation on the received CIR. The processor 140 can read the leakage from a lookup table stored in the memory 160 corresponding to specific antenna arrays 155. After the processor 140 obtains the leakage, the leakage is removed from the CIR by preprocessing as described herein, for example in operation 1630.

In operation 1815, the processor 140 determines the maximum value of the leakage cancelation output obtained in operation 1810. To determine the maximum value of the leakage cancelation output, the processor 140 calculates the power of the cancelation output and performs a maximum power search over the cancelation output.

In operation 1820, the processor 140 snaps a first CIR segment around the maximum power value over the cancelation result of operation 1810. By snapping the first segment of the CIR around the maximum power value, the accuracy of a distance estimation operation can be refined and improved compared to a distance estimation operation performed based on the CIR that does not have the leakage canceled.

In operation 1825, the processor 140 performs curve fitting on the snapped first segment of the CIR. The processor 140 outputs a resulting curve that is best fit for the snapped first segment of the CIR. In operation 1830, the processor 140 determines the maximum point, or value, of the curve fitting output. The maximum point can be denoted by a second-search maximum point on the snapped first segment of the CIR that includes the resulting curve. In some embodiments, the tap index of the second-search maximum point is a coarse estimation of the object distance.

In operation 1835, the processor 140 snaps a second segment of the CIR around the tap index of the second-search maximum point. The snapped second segment of the CIR is a segment of the leakage canceled CIR after the curve fitting in operation 1830. The snapped second segment of the CIR can be used to refine the accuracy of the coarse distance estimation obtained in operation 1830.

For example, in operation 1840, the processor 140 performs interpolation on the snapped second segment of the CIR. The interpolation can be performed with a finer sampling set. In operation 1845 the processor 140 performs curve fitting on the interpolated second segment. The curve fitting operation 1845 can be similar to the curve fitting operation 1825.

In operation 1850, the processor 140 finds the maximum point, or value, of the curve fitting output of the interpolated second segment. The maximum point can be denoted by a third-search maximum point on the interpolated second segment that includes the resulting curve of the curve fitting output.

In operation 1855, the processor 140 uses the tap index of the maximum values for distance estimation. In particular, the processor 140 calculates the offset of the tap index of the third-search maximum value from the tap index of the second-search maximum value. The calculated index offset can then be converted to a distance adjustment from the coarse distance estimation value obtained in operation 1830. In other words, the coarse estimation value, in terms of distance from the electronic device 100, can be adjusted based on the calculated index offset. Following the distance adjustment, the final output of the object distance estimation is obtained and the object distance can be more reliably estimated. Although depicted herein as a series of steps, various operations can be performed simultaneously, be performed in a different order, or omitted from the method 1800.

Figure 19:
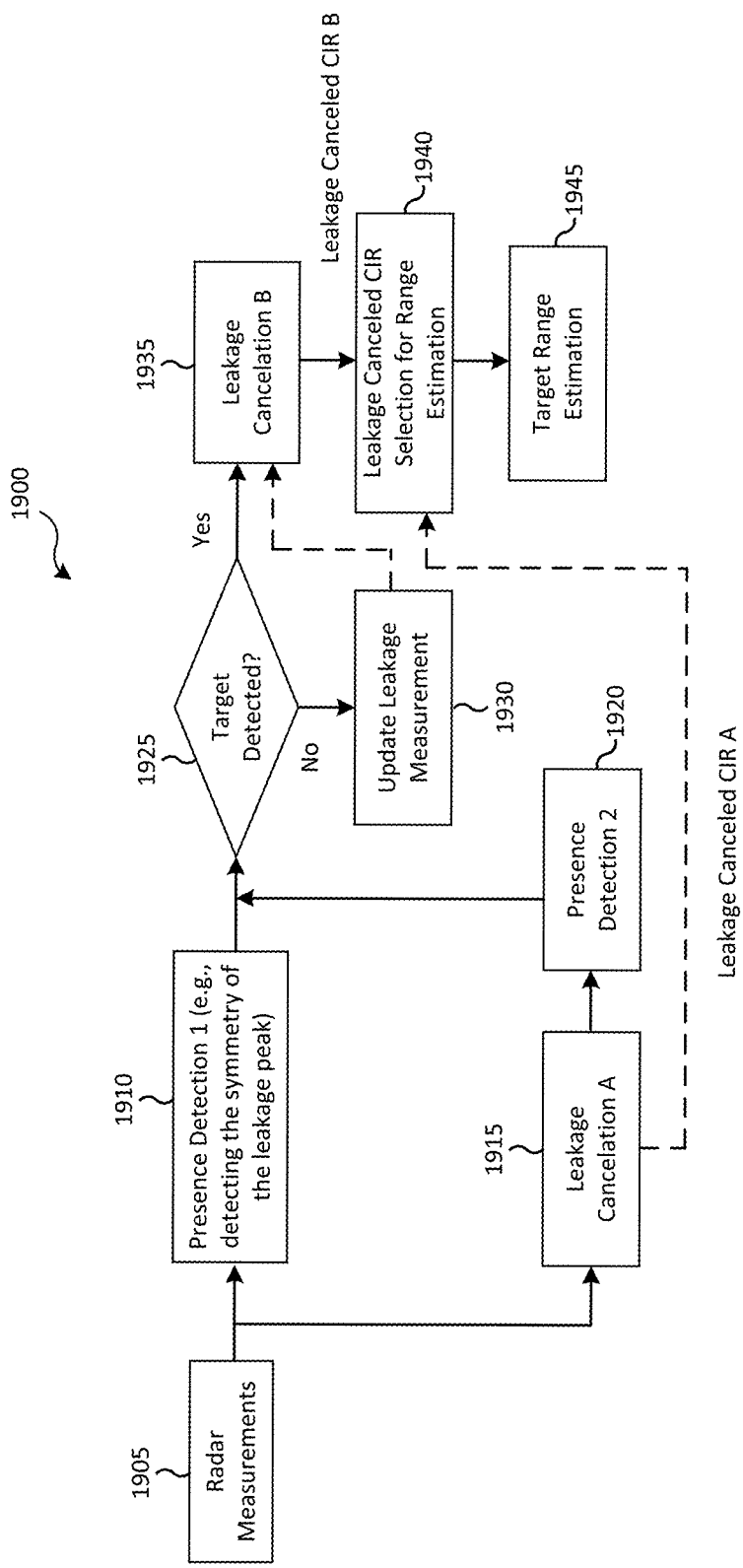
FIG. 19 illustrates an embodiment of joint presence detection and range estimation according to various embodiments of the present disclosure.

Various embodiments described herein can result in different performances for different ranges or delay taps. Accordingly, different embodiments of leakage cancelation methods can be combined to improve performance of presence detection and range estimation. For example, FIG. 19 illustrates an embodiment of joint presence detection and range estimation according to various embodiments of the present disclosure. The method 1900 is for illustration only, and includes one or more embodiments described herein. More or fewer steps or operations can be included in method 1900. The method 1900 illustrated in FIG. 19 can be used as an automatic leakage update procedure to update baseline leakage measurements stored in the memory 160 for more efficient and accurate leakage cancelation and target range estimation over time.

FIG. 19 illustrates a method 1900 that utilizes two features for presence detection, by detecting the symmetry of the leakage peak, for example as described in method 600, and the signals after the leakage cancelation, for example as described in the method 1800 or another leakage cancelation method. Although described herein as using the leakage symmetry and the signals after the leakage cancelation, various embodiments as described herein can be used by the processor 140 for joint presence detection and range estimation.

In operation 1905, the processor 140 controls to perform radar measurements. Performing the radar measurements can include obtaining the CIR sequence by analyzing and measuring the signal transmitted by the transmitter 157 and received by the receiver 159. Based on the obtained CIR sequence, the processor 140 can perform presence detection and range estimation by a combination of embodiments described separately herein in order to provide more robust and accurate presence detection and range estimation results.

In operation 1910, the processor 140 performs a first presence detection operation, Presence Detection 1. As illustrated in FIG. 19A, the Presence Detection 1 is a leakage symmetry detection operation such as described in FIG. 6. However, various methods of first presence detection described herein can be used, such as the variance of amplitude as described in FIG. 9 or variance of phase as described in FIG. 11.

In operation 1915, the processor 140 performs leakage cancelation A on the CIR obtained in operation 1905.

Leakage cancelation A is the first leakage cancelation operation performed in method 1900. The resulting output of leakage cancelation A is referred to as a leakage canceled CIR A. In operation 1920, the processor 140 performs a second presence detection operation, Presence Detection 2, based on the leakage cancelation of operation 1915. In various embodiments, Presence Detection 2 can use signals following the leakage cancelation. For example, the combination of operations 1915 and 1920 can include the method 1800 described in FIG. 18.

In operation 1925, the processor 140 determines whether a target has been detected based on the results of Presence Detection 1 in operation 1910 and Presence Detection 2 in operation 1920. In some embodiments, the processor 140 can determine a target has been detected based on a target being detected in each of Presence Detection 1 and Presence Detection 2. In other embodiments, the processor 140 can determine a target has been detected based on a target being detected in either of Presence Detection 1 and Presence Detection 2. If a target is detected, the processor 140 proceeds to operation 1935. If a target is not detected, the processor 140 proceeds to operation 1930. In operation 1930, based on the processor 140 determining a target is not present, the processor 140 updates the leakage measurement that is stored in the memory 160. For example, the processor 140 can update a baseline leakage measurement that is stored in the memory 160 for future use in a target detection and range estimation operation.

In operation 1935, the processor 140 performs leakage cancelation B. Leakage cancelation B is the second leakage cancelation operation performed in method 1900 and can be different from leakage cancelation A. In some embodiments, shown in FIG. 19A, the leakage cancelation B can be performed using leakage measurements saved in the memory 160. For example, when a baseline leakage measurement is stored in the memory 160, the processor 140 can read the baseline leakage measurement from the memory 160 and incorporate the baseline leakage measurement in the leakage cancelation operation. Incorporating the baseline leakage measurement in the leakage cancelation operation can result in a more accurate leakage cancelation to more effectively identify the position of the target object. The resulting output of leakage cancelation B is referred to as leakage canceled CIR B.

In operation 1940, the processor 140 performs range estimation based on the leakage canceled CIR B. In particular, the processor 140 combines, or fuses, the leakage canceled CIR A and the leakage canceled CIR B for a more accurate range estimation over a range of distances. In some embodiments, the leakage canceled CIR A can be used to yield a clean leakage cancelation on a short distance range from the electronic device 100 and the leakage canceled CIR B can be used to yield a clean leakage cancelation on a long-distance range from the electronic device 100. For example, the short distance range can be defined as less than 5 cm from the electronic device 100 and the long-distance range can be defined as between 5 cm and 10 cm from the electronic device 100, but other embodiments are possible. By combining leakage canceled CIRs for each of a short range and a longer range, range estimation can be more accurately performed for a greater range of distances.

In operation 1945, the processor 140 performs target range estimation based on the fused leakage canceled CIR. For example, the target range estimation can be performed using the method 1800 described in FIG. 18. Based on the location of the target object, the processor 140 can utilize either of the leakage canceled CIR A and the leakage canceled CIR B to perform range estimation. For example, the processor 140 can utilize the leakage canceled CIR A to estimate the range of a target object that is less than 5 cm from the electronic device 100 and can utilize the leakage canceled CIR B to estimate the range of a target object that is greater than 5 cm from the electronic device 100. Therefore, operation 1945 can further include performing a coarse range estimation of the distance of the target object from the device, selecting which leakage canceled CIR to use for the range estimation based on the coarse range estimation, and performing range estimation using the selected leakage canceled CIR.

Figure 20:
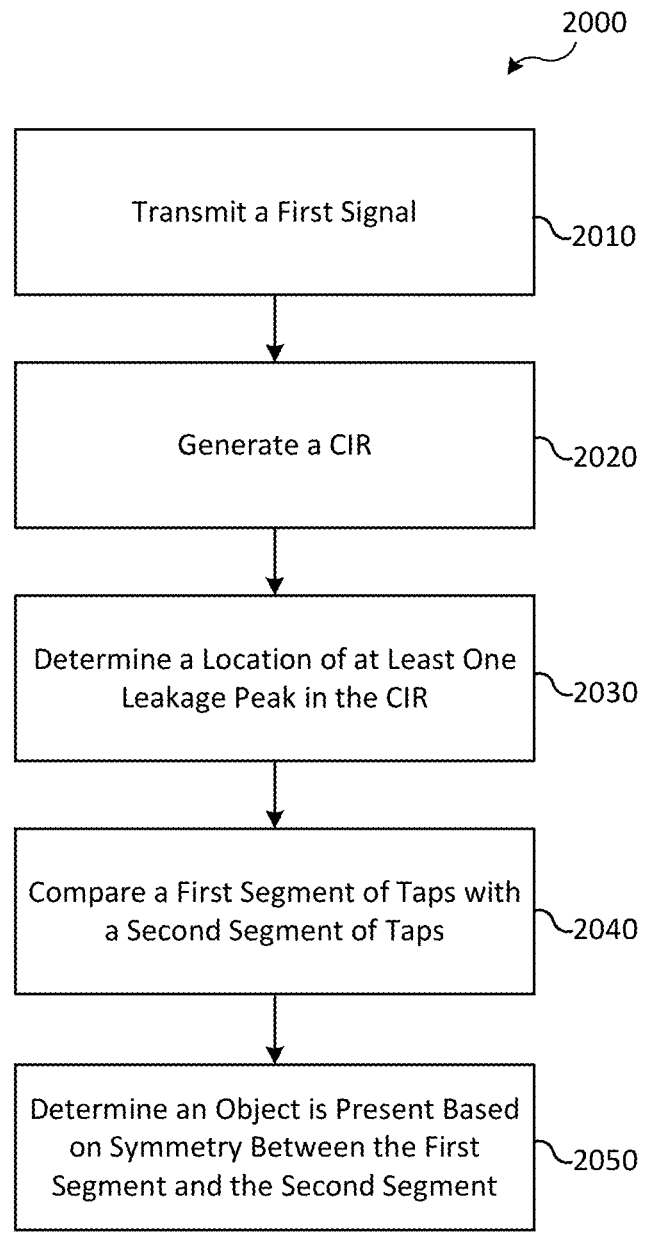
FIG. 20 illustrates a method of object detection according to various embodiments of the present disclosure.

FIG. 20 illustrates a method of object detection according to various embodiments of the present disclosure. The method 2000 is for illustration only, and includes one or more embodiments described herein. More or fewer steps or operations can be included in method 2000.

In operation 2010, a first signal is transmitted by at least one transmitter antenna. In some embodiments, the processor 140 controls the transmitter 157 to transmit the first signal. In other embodiments, the transmitter 157 can transmit the first signal at a regular, predefined interval of time. For example, the transmitter 157 can transmit the first signal every second, every minute, or according to any other suitable interval.

In operation 2020, the processor 140 generates a CIR based on the receipt, by the receiver 159, of a reflection of the first signal transmitted by the transmitter 157 in operation 2010. In operation 2030, a location of at least one leakage peak in the CIR is determined. In some embodiments, the processor 140 is configured to determine the location of the at least one leakage peak in the CIR generated in operation 2020.

In operation 2040, the processor 140 compares a first segment of taps in the CIR prior to the at least one leakage peak to a second segment of taps in the CIR after the leakage peak. In some embodiments, the first segment of taps can be a number of taps directly before, or to the left of, the determined at least one leakage peak and the second segment of taps can be a number of taps directly after, or to the right of, the determined at least one leakage peak. In some embodiments, the number of taps in the first segment of taps can be the same as the number of taps in the second segment of taps. In operation 2050, the processor 140 determines an object is present based on symmetry between the first and second segments of taps.

In some embodiments, the at least one transmitter antenna is a plurality of transmitter antennas, the at least one receiver antenna is a plurality of receiver antennas, and an antenna pair includes at least one of the plurality of transmitter antennas and at least one of the plurality of receiver antennas. The method can further comprise transmitting, by the plurality of transmitter antennas, a plurality of signals, generating a CIR for each of the antenna pairs based on receipt, by the plurality of receiver antennas, of reflection of the plurality of signals, and detecting deviation among the CIRs generated for each of the antenna pairs. Determining the object is present can further comprise determining an object is present based on the deviation among the CIRs.

In some embodiments, the deviation is in at least one of signal power or signal phase among the CIRs for each of the antenna pairs. In some embodiments, determining the object is present further comprises determining (i) that a level of the symmetry between the first and second segments of taps is outside of a predefined symmetry threshold, and (ii) that a level of the deviation among the CIRs for each of the antenna pairs exceeds a predefined deviation threshold.

In some embodiments, determining the location of the at least one leakage peak in the CIR comprises determining the location of a first leakage peak and a second leakage peak and determining the object is present further comprises determining the object is present based on an inconsistency between amplitudes of delay taps of the first leakage peak and delay taps of the second leakage peak. In some embodiments, the inconsistency can be determined based on exploiting the constant relationship between the second and first leakage to translate the first segment of the first leakage (i.e., the left side of the main leakage) into the leakage of the second leakage, subtracting the obtained leakage estimate (i.e., the result of the translation) from the raw radar signal, and checking if the maximum residual after the subtraction exceeds a predefined threshold.

In some embodiments, the method can further comprise generating a leakage measurement in response to determining that no object is detected and storing, in a memory, the leakage measurement for leakage cancelation. In some embodiments, the method can further comprise generating a second CIR, determining that the object is present based on the second CIR, canceling leakage from the second CIR based on the stored leakage measurement, and estimating a distance of the detected object from the electronic device based on the leakage canceled second CIR.

None of the description in this application should be read as implying that any particular element, step, or function is an essential element that must be included in the claim scope. Moreover, none of the claims is intended to invoke 35 U.S.C. § 112(f) unless the exact words "means for" are followed by a participle.

What is claimed is:

1. An electronic device comprising:
at least a first antenna pair comprising at least one first transmitter antenna configured to transmit signals and at least one first receiver antenna configured to receive signals;
a memory configured to store data; and
a processor operably connected to the first antenna pair, the processor configured to:
control the first transmitter antenna to transmit a first signal,
generate a channel impulse response (CIR) based on receiving, by the first receiver antenna, a reflection of the first signal,
determine a location of at least one leakage peak in the CIR,
compare a first segment of taps in the CIR prior to the at least one leakage peak with a second segment of taps in the CIR after the leakage peak, and
determine an object is present based on symmetry between the first and second segments of taps.

2. The electronic device of claim 1, wherein:
the at least one transmitter antenna comprises a plurality of transmitter antennas;
the at least one receiver antenna comprises a plurality of receiver antennas;
the electronic device further comprises a plurality of antenna pairs including at least one of the plurality of transmitter antennas and at least one of the plurality of receiver antennas; and
the processor is configured to:
control the plurality of transmitter antennas to transmit a plurality of signals,
generate a CIR for each of the antenna pairs based on receiving, by the plurality of receiver antennas, a plurality of reflections of the plurality of signals, respectively, and
detect deviation among the CIRs generated for each of the antenna pairs, and
to determine the object is present, the processor is further configured to determine an object is present based on the deviation among the CIRs.

3. The electronic device of claim 2, wherein the deviation is in at least one of signal power or signal phase among the CIRs for each of the antenna pairs.

4. The electronic device of claim 2, wherein, to determine the object is present, the processor is configured to determine the object is present based on a determination that a level of the symmetry between the first and second segments of taps is outside of a predefined symmetry threshold.

5. The electronic device of claim 2, wherein, to determine the object is present, the processor is configured to determine the object is present based on a determination that a level of the deviation among the CIRs for each of the antenna pairs exceeds a predefined deviation threshold.

6. The electronic device of claim 1, wherein the processor is further configured to:
to determine the location of the at least one leakage peak in the CIR, determine the location of a first leakage peak and a second leakage peak; and
to determine the object is present, determine the object is present based on an inconsistency between amplitudes of delay taps of the first leakage peak and delay taps of the second leakage peak.

7. The electronic device of claim 1, wherein the processor is further configured to:
generate a leakage measurement in response to determining that no object is detected;
store, in the memory, the leakage measurement for leakage cancelation;
generate a second CIR;
determine that the object is present based on the second CIR;
cancel leakage from the second CIR based on the stored leakage measurement; and
estimate a distance of the detected object from the electronic device based on the leakage canceled second CIR.

8. A method comprising:
transmitting, via at least one transmitter antenna of an electronic device, a first signal;
generating a channel impulse response (CIR) based on receiving, by at least one receiver antenna of the electronic device, a reflection of the first signal;
determining a location of at least one leakage peak in the CIR;
comparing a first segment of taps in the CIR prior to the at least one leakage peak with a second segment of taps in the CIR after the leakage peak; and
determining an object is present based on symmetry between the first and second segments of taps.

9. The method of claim 8, wherein the at least one transmitter antenna is a plurality of transmitter antennas, the at least one receiver antenna is a plurality of receiver antennas, and an antenna pair includes at least one of the plurality of transmitter antennas and at least one of the plurality of receiver antennas, the method further comprising:
transmitting, by the plurality of transmitter antennas, a plurality of signals;

generating a CIR for each of the antenna pairs based on receipt, by the plurality of receiver antennas, of reflection of the plurality of signals; and detecting deviation among the CIRs generated for each of the antenna pairs;

wherein determining the object is present further comprises determining an object is present based on the deviation among the CIRs.

10. The method of claim 9, wherein the deviation is in at least one of signal power or signal phase among the CIRs for each of the antenna pairs.

11. The method of claim 9, wherein determining the object is present further comprises determining the object is present based on determining that a level of the symmetry between the first and second segments of taps is outside of a predefined symmetry threshold.

12. The method of claim 9, wherein determining the object is present further comprises determining the object is present based on determining that a level of the deviation among the CIRs for each of the antenna pairs exceeds a predefined deviation threshold.

13. The method of claim 8, wherein:

determining the location of the at least one leakage peak in the CIR comprises determining the location of a first leakage peak and a second leakage peak; and determining the object is present further comprises determining the object is present based on an inconsistency between amplitudes of delay taps of the first leakage peak and delay taps of the second leakage peak.

14. The method of claim 8, further comprising:

generating a leakage measurement in response to determining that no object is detected;

storing, in a memory, the leakage measurement for leakage cancelation;

generating a second CIR;

determining that the object is present based on the second CIR;

canceling leakage from the second CIR based on the stored leakage measurement; and estimating a distance of the detected object from the electronic device based on the leakage canceled second CIR.

15. A non-transitory computer readable medium storing instructions that, when executed by a processor of an electronic device, causes the electronic device to:

control to transmit, via at least one transmitter antenna of the electronic device, a first signal;

generate a channel impulse response (CIR) based on receiving, by at least one receiver antenna of the electronic device, a reflection of the first signal;

determine a location of at least one leakage peak in the CIR;

compare a first segment of taps in the CIR prior to the at least one leakage peak with a second segment of taps in the CIR after the leakage peak; and determine an object is present based on symmetry between the first and second segments of taps.

16. The non-transitory computer readable medium of claim 15, wherein the at least one transmitter antenna is a plurality of transmitter antennas, the at least one receiver antenna is a plurality of receiver antennas, and an antenna pair includes at least one of the plurality of transmitter antennas and at least one of the plurality of receiver antennas, the non-transitory computer readable medium further storing instructions that, when executed by the processor, cause the processor to:

transmit, by the plurality of transmitter antennas, a plurality of signals;

generate a CIR for each of the antenna pairs based on receipt, by the plurality of receiver antennas, of reflection of the plurality of signals; and detect deviation among the CIRs generated for each of the antenna pairs;

wherein to determine the object is present, the non-transitory computer readable medium further stores instructions that, when executed by the processor, cause the processor to determine an object is present based on the deviation among the CIRs.

17. The non-transitory computer readable medium of claim 16, wherein the deviation is in at least one of signal power or signal phase among the CIRs for each of the antenna pairs.

18. The non-transitory computer readable medium of claim 16, wherein the non-transitory computer readable medium further stores instructions that, when executed by the processor, cause the processor to determine the object is present based on determining that a level of the symmetry between the first and second segments of taps is outside of a predefined symmetry threshold.

19. The non-transitory computer readable medium of claim 16, wherein the non-transitory computer readable medium further stores instructions that, when executed by the processor, cause the processor to determine the object is present based on determining that a level of the deviation among the CIRs for each of the antenna pairs exceeds a predefined deviation threshold.

20. The non-transitory computer readable medium of claim 15, wherein the non-transitory computer readable medium further stores instructions that, when executed by the processor, cause the processor to:

to determine the location of the at least one leakage peak in the CIR, determine the location of a first leakage peak and a second leakage peak; and to determine the object is present, determine the object is present based on an inconsistency between amplitudes of delay taps of the first leakage peak and delay taps of the second leakage peak.

* * * * *